(12) United States Patent
Ten Kate

(10) Patent No.: US 11,379,047 B2
(45) Date of Patent: Jul. 5, 2022

(54) EVALUATING MOVEMENT OF A SUBJECT

(71) Applicant: Lifeline Systems Company, Framingham, MA (US)

(72) Inventor: Warner Rudolph Theophile Ten Kate, Waalre (NL)

(73) Assignee: Lifeline Systems Company, Framingham, MA (US)

( * ) Notice: Subject to any disclaimer, the term of this patent is extended or adjusted under 35 U.S.C. 154(b) by 0 days.

(21) Appl. No.: 16/899,659

(22) Filed: Jun. 12, 2020

(65) Prior Publication Data

US 2020/0409466 A1    Dec. 31, 2020

(30) Foreign Application Priority Data

Jun. 25, 2019    (EP) .................................... 19182377

(51) Int. Cl.
| | |
|---|---|
| *G06F 3/01* | (2006.01) |
| *G06F 17/18* | (2006.01) |
| *G08B 21/04* | (2006.01) |
| *G08B 21/18* | (2006.01) |

(52) U.S. Cl.
CPC .............. *G06F 3/017* (2013.01); *G06F 3/011* (2013.01); *G06F 17/18* (2013.01); *G08B 21/043* (2013.01); *G08B 21/0446* (2013.01); *G08B 21/182* (2013.01)

(58) Field of Classification Search
CPC .......... G06F 3/017; G06F 3/011; G06F 17/18; G08B 21/043; G08B 21/0446; G08B 21/182

USPC ........................................................ 715/863
See application file for complete search history.

(56) References Cited

U.S. PATENT DOCUMENTS

| | | | |
|---|---|---|---|
| 10,213,158 B2 | 2/2019 | Fyfe | |
| 2010/0049096 A1* | 2/2010 | Ten Kate | ........... G08B 21/0446 600/595 |
| 2011/0066081 A1* | 3/2011 | Goto | ...................... G16H 40/67 600/595 |

(Continued)

FOREIGN PATENT DOCUMENTS

| | | |
|---|---|---|
| CN | 102657 533 B | 11/2013 |
| WO | 2015036245 A1 | 3/2015 |

(Continued)

*Primary Examiner* — William D Titcomb
(74) *Attorney, Agent, or Firm* — Honigman LLP

(57) ABSTRACT

According to an aspect, there is provided a computer-implemented method for evaluating movement of a subject. The method comprises obtaining a first signal from a first sensor; processing the first signal to determine a value of a quality measure for the first signal; and determining a configuration for a movement evaluation algorithm. The configuration of the movement evaluation algorithm is dependent on the determined value of the quality measure for the first signal such that either or both of a decision threshold of the movement evaluation algorithm is determined based on the determined value of the quality measure; and one or more weightings used in the movement evaluation algorithm for the one or more first features that are to be derived from a signal from the first sensor are determined based on the determined value of the quality measure. A corresponding apparatus and computer program product are also provided.

20 Claims, 11 Drawing Sheets

(56) References Cited

U.S. PATENT DOCUMENTS

| | | | |
|---|---|---|---|
| 2011/0098608 A1* | 4/2011 | Griffiths | A61B 5/1123 |
| | | | 600/595 |
| 2011/0230791 A1* | 9/2011 | Ten Kate | G08B 29/22 |
| | | | 600/595 |
| 2012/0101411 A1 | 4/2012 | Hausdorff | |
| 2015/0206409 A1* | 7/2015 | Visvanathan | G08B 21/0423 |
| | | | 340/573.1 |
| 2015/0313552 A1 | 11/2015 | Zhang | |
| 2016/0038061 A1 | 2/2016 | Kechichian | |
| 2016/0100776 A1 | 4/2016 | Najafi | |
| 2016/0203692 A1* | 7/2016 | Ten Kate | A61B 5/681 |
| | | | 340/573.1 |
| 2016/0370179 A1 | 12/2016 | Goetzke | |
| 2017/0000384 A1* | 1/2017 | Annegarn | A61B 5/1118 |
| 2017/0103672 A1* | 4/2017 | Dey | G06F 3/0304 |

FOREIGN PATENT DOCUMENTS

| | | |
|---|---|---|
| WO | 2015113915 A1 | 8/2015 |
| WO | 2018127506 A1 | 7/2018 |

\* cited by examiner

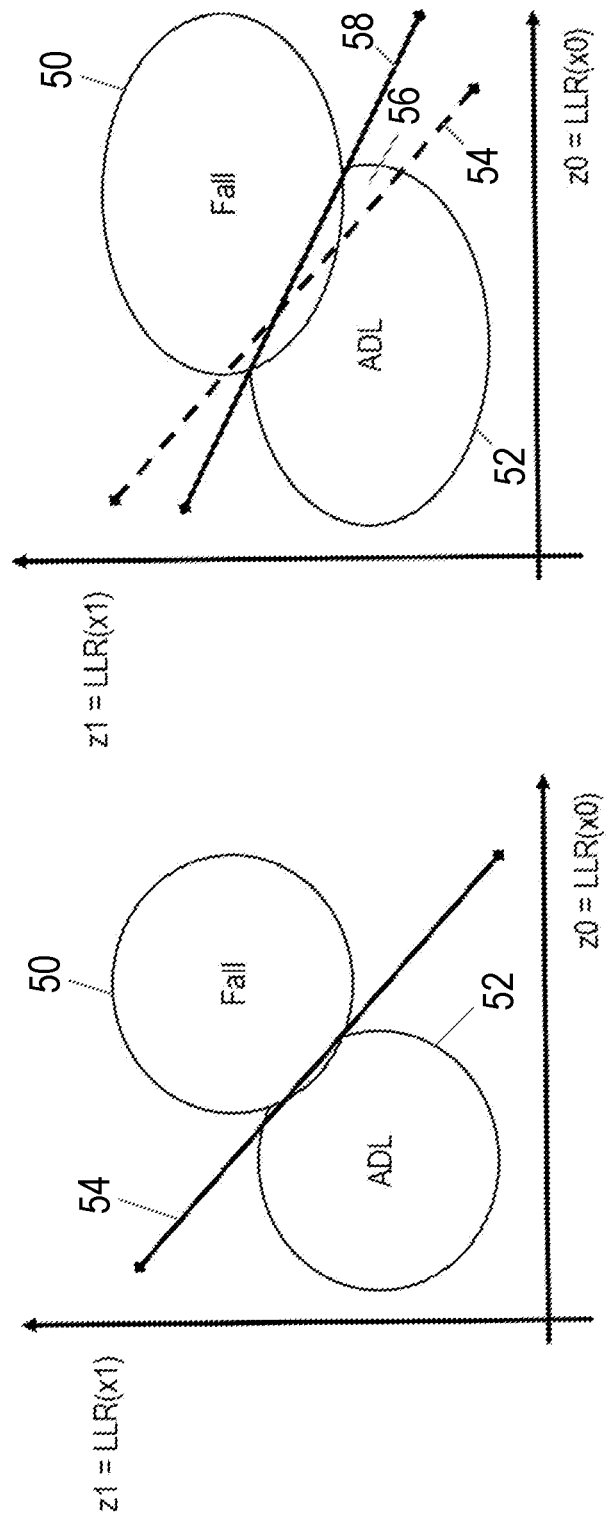

EVALUATING MOVEMENT OF A SUBJECT

CROSS REFERENCE TO PRIOR APPLICATIONS

This application claims the benefit of European Patent Application No. 19182377.2, filed Jun. 25, 2019 which is hereby incorporated by reference herein.

FIELD OF THE INVENTION

The invention relates to evaluating movement of a subject, and in particular to a computer-implemented method, apparatus and computer program product for evaluating movement of a subject.

BACKGROUND OF THE INVENTION

Falls are common among older adults. A fall is an event which typically results in a person impacting with and coming to rest on the ground or floor, or other lower level. In an estimated 20-30% of cases, falls lead to mild or severe injuries and may result in visits to an emergency department. A person lying on the ground or floor for a long time after a fall may be detrimental to the person, and therefore it is of importance to get help as fast as possible after a fall. Personal Emergency Response Systems (PERS) can enable people to signal for help by pressing a help button that is worn as a pendant around the neck or as a watch on the wrist. Other wearing locations include waist (belt), pockets and at the ears. When the person presses their help button, they can be connected to a help provider (e.g. in a call centre) via an in-home communicator.

In addition to a help button, certain PERS devices can contain one or more sensors, such as an accelerometer and air pressure sensor, for enabling falls to be automatically detected. Algorithms that use the sensor signal(s) as input may be used to automatically trigger an alarm in case a fall is detected. This may result in help being obtained for the person more quickly, particularly if the person is not able to press the help button (e.g. the person is unconscious) or forgets to press the button. These algorithms typically determine values for one or more features from the sensor signals (e.g. an impact magnitude, a change in altitude, etc.) and determine whether a fall has occurred on the basis of those feature values.

In some cases the PERS functionality is provided by a dedicated device (e.g. that comprises the sensor(s) and capability to process the sensor signals), but in other cases the PERS functionality can be provided by a more general purpose electronic device that includes suitable sensors, such as a smartphone or smartwatch, and that runs a PERS software application.

In either case it is important for the reliable operation of the fall detection for the signals and measurements provided by the sensor(s) to be accurate and free (or relatively free) from artefacts. The accuracy of a sensor can depend on the quality of the sensor, and the quality of a sensor can vary between different types of electronic device (including dedicated PERS devices) that can provide PERS and/or fall detection capability. In addition, some sensors may require calibration before use, and/or require calibration from time to time, and a poor calibration or a calibration that drifts over time can affect the accuracy of the measurements from the sensor or features derived therefrom. In the case of a more general electronic device that includes suitable sensors, the provider of the PERS software application is not able to control the quality of the sensors in the device, and may not be able to adequately calibrate the sensors.

Similar considerations apply to other types of devices (or software applications) that generally evaluate the movement of a person, for example that detect footsteps of the person in order to detect when the person is walking, or that detect when a person has stood up from sifting on a chair (known as a sit-to-stand (STS) movement or STS transfer). Various measured characteristics of a person's movement (e.g. walking) can be used by clinicians to assess the mobility of the person, including assessing a person's risk of falling.

Therefore there is a need for techniques that provide for reliable evaluation of the movement of a person irrespective of artefacts or quality issues present in a measurement signal from a sensor that measures the movements of the person.

SUMMARY OF THE INVENTION

One example of sensor artefacts affecting the reliable evaluation of movement of a person is an acceleration signal from an accelerometer that can suffer from drift, i.e. the measurements can include an offset (also referred to as a DC offset), and so any features derived as part of a fall detection algorithm that are sensitive to drift or offset may be less reliable (or even unreliable), thereby affecting the reliability of the fall detection outcome (i.e. fall or no fall). For example, a positive offset in the acceleration measurements could lead to an acceleration threshold for detecting an impact being exceeded (suggesting a fall) even though no impact has occurred. Other features that can be sensitive to drift or offset include peak power and peak acceleration during a sit-to-stand movement.

Another example is an air pressure sensor used to measure changes in altitude where the environmental air pressure changes or fluctuates due to weather conditions, such as storms or wind, or where an air vent in a housing that leads to the air pressure sensor can be obstructed from time to time. In such situations the environmental air pressure can exhibit large fluctuations, which can be identified as changes in altitude of the person, which in turn may produce an unreliable result from the movement evaluation algorithm.

In a general case, the measurements from any type of sensor may have an intrinsic amount of noise in the measurements due to the age/quality of the sensor, or the way in which the sensor is installed in the device. In this case the noise present in the measurements may affect the reliability of any features derived from the measurements.

One approach to addressing this problem is to use a movement evaluation algorithm that does not extract features that are sensitive to the artefacts or quality issues, e.g. an algorithm that only extracts features from acceleration measurements that are not sensitive to offset or drift in the measurements. For example, a mobility or fall risk evaluation algorithm can use offset-robust features such as walking intensity, walking regularity and maximum jerk during a STS transfer. However, this is not ideal, as signal artefacts and quality issues may not be present all of the time (or even a majority of the time), and the features that are not used may have provided useful information for evaluating the movement and improved the reliability of the movement evaluation algorithm.

The techniques proposed herein provide an alternative approach in which the configuration of the movement evaluation algorithm is adjusted or adapted in response to measurement signal quality issues. For example, a decision threshold of the movement evaluation algorithm (for example a threshold beyond which a fall is detected) may be determined based on the measurement signal quality. As another example, a weighting used in the movement evaluation algorithm for a feature derived from the measurement signal (i.e. where the weighting indicates an influence of the feature on the movement evaluation) can be determined based on the measurement signal quality. In this way, the effect of signal quality issues on the reliability of the output of the movement evaluation algorithm can be reduced. These techniques can be used both with dedicated devices for evaluating movement (e.g. a PERS device, a fall detector, a walking detector, etc.), and other devices that can be programmed or configured to evaluate movement (e.g. a smartphone or smartwatch).

According to a first specific aspect, there is provided a computer-implemented method for evaluating movement of a subject. The method comprises obtaining a first signal from a first sensor; processing the first signal to determine a value of a quality measure for the first signal; and determining a configuration for a movement evaluation algorithm. The configuration of the movement evaluation algorithm is dependent on the determined value of the quality measure for the first signal such that either or both of: a decision threshold of the movement evaluation algorithm is determined based on the determined value of the quality measure; and one or more weightings used in the movement evaluation algorithm for one or more first features that are to be derived from a signal from the first sensor are determined based on the determined value of the quality measure. Thus, the first aspect enables reliable evaluation of the movement of a subject irrespective of artefacts or quality issues present in a measurement signal from a sensor that measures the subject.

In some embodiments the method further comprises obtaining a further first signal from the first sensor, the further first signal representing measurements of the subject; and processing the further first signal using the movement evaluation algorithm with the determined configuration. In these embodiments the configuration of the movement evaluation algorithm can be determined prior to the first sensor being carried or worn by the subject, for example including during manufacture or installation of the first sensor, or when the first sensor is paired with an apparatus that performs the method. Alternatively, these embodiments also apply where a configuration of the movement evaluation algorithm is determined using the first signal and then subsequent measurements of the subject are obtained and the movement of the subject evaluated from those measurements.

In alternative embodiments, the first signal is a signal representing measurements of the subject, and the method further comprises processing the first signal using the movement evaluation algorithm with the determined configuration. These embodiments enable the configuration of the movement evaluation algorithm to be determined from the same signal that the movement of the subject is to be evaluated from.

In some embodiments the decision threshold of the movement evaluation algorithm is a function of the value of the quality measure. In these embodiments the movement evaluation algorithm can be configured based on the value of the quality measure such that, at a first quality of the first signal, the decision threshold has a first value, and at a second quality of the first signal that is lower than the first quality, the decision threshold has a second value that is higher than the first value of the decision threshold. In this way, the reliability of the decision to be output by the movement evaluation algorithm is increased if the quality of the first signal is low.

In alternative embodiments, the movement evaluation algorithm is configured based on the value of the quality measure such that, at a first quality of the first signal, the decision threshold is an operating point on a first receiver operating characteristics, ROC, curve that provides a first specificity and first detection probability, and at a second quality of the first signal that is lower than the first quality, the decision threshold is an operating point on a second ROC curve that provides a second specificity that is higher than the first specificity and a second detection probability that is lower than the first detection probability.

In some embodiments the one or more weightings are a function of the value of the quality measure. In these embodiments each weighting has a non-zero value between 0 and 1. Thus, regardless of the value of the quality measure, each first feature is still able to contribute to the decision made by the movement evaluation algorithm. In some embodiments the movement evaluation algorithm is configured based on the value of the quality measure such that, at a first quality of the first signal, a first weighting for a first specific first feature has a first value, and at a second quality of the first signal that is lower than the first quality, the first weighting has a second value that is lower than the first value of the first weighting. Thus, these embodiments provide that the influence of a first feature on the decision of the movement evaluation algorithm is reduced when the quality of the first signal is low, and vice versa. In these embodiments the first specific first feature is a first feature whose accuracy and/or reliability is dependent on the quality of the first signal. In these embodiments a second specific first feature is derived from the signal from the first sensor as part of the movement evaluation algorithm, and the weighting for the second specific first feature is not dependent on the value of the quality measure. The second specific first feature is a first feature whose accuracy and/or reliability is not dependent on the quality of the first signal.

In some embodiments, in the movement evaluation algorithm: values for the one or more first features are derived from a signal from the first sensor; the values are combined according to the one or more weightings; and the combined values are compared with one or more decision thresholds.

In some embodiments the first sensor is an accelerometer and the signal from the accelerometer is an acceleration signal representing acceleration measurements. In these embodiments the one or more first features can comprise any one or more of: presence of an impact; change in altitude; velocity; vertical velocity; orientation of the subject and/or a part of the body of the subject; change in orientation of the subject and/or a part of the body of the subject; duration of the subject rising from a chair; peak acceleration of the subject rising from a chair; peak power of the subject rising from a chair; maximum jerk of the subject rising from a chair; and variance, period, periodicity, sample entropy and/or cadence of walking by the subject. In these embodiments the quality measure can be a measure of an offset in the acceleration signal. In these embodiments the one or more weightings for any of presence of an impact; change in altitude; velocity; vertical velocity; orientation of the subject and/or a part of the body of the subject; duration of the subject rising from a chair; peak acceleration of the subject rising from a chair; and peak power of the subject rising from a chair, can be determined based on the determined value of the offset. In these embodiments one or more weightings for any of change in orientation of the subject and/or a part of the body of the subject; maximum jerk of the subject rising from a chair; and variance, period, periodicity, sample entropy and/or cadence of walking by the subject may not be determined based on the determined value of the offset.

In some embodiments the first sensor is an air pressure sensor and the signal from the air pressure sensor is an air pressure signal representing air pressure measurements. In these embodiments the one or more first features may comprise any one or more of: altitude, change in altitude of the subject; vertical velocity; and vertical acceleration. In these embodiments the quality measure may be a measure of variance in the air pressure signal or a measure of variance in differences in the air pressure signal. In these embodiments the weighting for altitude may be determined based on the determined measure of variance.

In some embodiments the movement evaluation algorithm evaluates the movement of the subject to determine one or more of: whether the subject has fallen, a fall risk for the subject, a mobility level of the subject and the physical activity or activities performed by the subject.

According to a second aspect, there is provided a computer program product comprising a computer readable medium having computer readable code embodied therein, the computer readable code being configured such that, on execution by a suitable computer or processor, the computer or processor is caused to perform the method according to the first aspect or any embodiment thereof.

According to a third aspect, there is provided an apparatus for evaluating movement of a subject. The apparatus comprises a processing unit that is configured to: obtain a first signal from a first sensor; process the first signal to determine a quality measure for the first signal; and determine a configuration for a movement evaluation algorithm that is for evaluating movement of the subject. The configuration of the movement evaluation algorithm is dependent on the determined value of the quality measure for the first signal such that either or both of: a decision threshold of the movement evaluation algorithm is determined based on the determined value of the quality measure; and one or more weightings used in the movement evaluation algorithm for one or more first features derived from a signal from the first sensor are determined based on the determined value of the quality measure. Thus, the third aspect enables reliable evaluation of the movement of a subject irrespective of artefacts or quality issues present in a measurement signal from a sensor that measures the subject.

In some embodiments the processing unit is further configured to obtain a further first signal from the first sensor, the further first signal representing measurements of the subject; and process the further first signal using the movement evaluation algorithm with the determined configuration. In these embodiments the configuration of the movement evaluation algorithm can be determined prior to the first sensor being carried or worn by the subject, for example including during manufacture or installation of the first sensor, or when the first sensor is paired with the apparatus. Alternatively, these embodiments also apply where a configuration of the movement evaluation algorithm is determined using the first signal and then subsequent measurements of the subject are obtained and the movement of the subject evaluated from those measurements.

In alternative embodiments, the first signal is a signal representing measurements of the subject, and the processing unit is further configured to process the first signal using the movement evaluation algorithm with the determined configuration. These embodiments enable the configuration of the movement evaluation algorithm to be determined from the same signal that the movement of the subject is to be evaluated from.

In some embodiments the decision threshold of the movement evaluation algorithm is a function of the value of the quality measure. In these embodiments the movement evaluation algorithm can be configured based on the value of the quality measure such that, at a first quality of the first signal, the decision threshold has a first value, and at a second quality of the first signal that is lower than the first quality, the decision threshold has a second value that is higher than the first value of the decision threshold. In this way, the reliability of the decision to be output by the movement evaluation algorithm is increased if the quality of the first signal is low.

In alternative embodiments, the movement evaluation algorithm is configured based on the value of the quality measure such that, at a first quality of the first signal, the decision threshold is an operating point on a first receiver operating characteristics, ROC, curve that provides a first specificity and first detection probability, and at a second quality of the first signal that is lower than the first quality, the decision threshold is an operating point on a second ROC curve that provides a second specificity that is higher than the first specificity and a second detection probability that is lower than the first detection probability.

In some embodiments the one or more weightings are a function of the value of the quality measure. In these embodiments each weighting has a non-zero value between 0 and 1. Thus, regardless of the value of the quality measure, each first feature is still able to contribute to the decision made by the movement evaluation algorithm. In some embodiments the movement evaluation algorithm is configured based on the value of the quality measure such that, at a first quality of the first signal, a first weighting for a first specific first feature has a first value, and at a second quality of the first signal that is lower than the first quality, the first weighting has a second value that is lower than the first value of the first weighting. Thus, these embodiments provide that the influence of a first feature on the decision of the movement evaluation algorithm is reduced when the quality of the first signal is low, and vice versa. In these embodiments the first specific first feature is a first feature whose accuracy and/or reliability is dependent on the quality of the first signal. In these embodiments a second specific first feature is derived from the signal from the first sensor as part of the movement evaluation algorithm, and the weighting for the second specific first feature is not dependent on the value of the quality measure. The second specific first feature is a first feature whose accuracy and/or reliability is not dependent on the quality of the first signal.

In some embodiments, in the movement evaluation algorithm: the processing unit is configured to derive values for the one or more first features from a signal from the first sensor; combined the derived values according to the one or more weightings; and compare the combined values with one or more decision thresholds.

In some embodiments the first sensor is an accelerometer and the signal from the accelerometer is an acceleration signal representing acceleration measurements. In these embodiments the one or more first features can comprise any one or more of: presence of an impact; change in altitude; velocity; vertical velocity; orientation of the subject and/or a part of the body of the subject; change in orientation of the subject and/or a part of the body of the subject; duration of the subject rising from a chair; peak acceleration of the subject rising from a chair; peak power of the subject rising from a chair; maximum jerk of the subject rising from a chair; and variance, period, periodicity, sample entropy and/or cadence of walking by the subject. In these embodiments the quality measure can be a measure of an offset in the acceleration signal. In these embodiments the one or more weightings for any of presence of an impact; change in altitude; velocity; vertical velocity; orientation of the subject and/or a part of the body of the subject; duration of the subject rising from a chair; peak acceleration of the subject rising from a chair; and peak power of the subject rising from a chair, can be determined based on the determined value of the offset. In these embodiments one or more weightings for any of change in orientation of the subject and/or a part of the body of the subject; maximum jerk of the subject rising from a chair; and variance, period, periodicity, sample entropy and/or cadence of walking by the subject may not be determined based on the determined value of the offset.

In some embodiments the first sensor is an air pressure sensor and the signal from the air pressure sensor is an air pressure signal representing air pressure measurements. In these embodiments the one or more first features may comprise any one or more of: altitude, change in altitude of the subject; vertical velocity; and vertical acceleration. In these embodiments the quality measure may be a measure of variance in the air pressure signal or a measure of variance in differences in the air pressure signal. In these embodiments the weighting for altitude may be determined based on the determined measure of variance.

In some embodiments the movement evaluation algorithm evaluates the movement of the subject to determine one or more of: whether the subject has fallen, a fall risk for the subject, a mobility level of the subject and the physical activity or activities performed by the subject.

In some embodiments the apparatus further comprises the first sensor. In alternative embodiments, the processing unit is configured to obtain the first signal from a first sensor that is separate from the apparatus.

According to a fourth aspect, there is provided a system for evaluating movement of a subject. The system comprises a device that is to be worn or carried by a subject and that comprises a first sensor for generating the first signal; and an apparatus according to the third aspect or any embodiment thereof.

In some embodiments, the apparatus is part of the device. In alternative embodiments, the apparatus is separate from the device.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which:

FIGS. 7(a) and 7(b) are scatter plots of Log Likelihood Ratio (LLR) values for two different features;

DETAILED DESCRIPTION OF EMBODIMENTS

As noted above, it is desirable to provide improvements in the processing of sensor measurements to evaluate the movements of a person (referred to hereafter as a 'subject'), for example evaluating the walking ability of the subject, evaluating whether the subject has suffered a fall, detecting a sit-to-stand movement, evaluating a sit-to-stand movement, or determining the physical activity of the subject (i.e. determine what activity the subject is doing, such as sitting down, standing up, walking, running, ascending stairs, descending stairs, falling, lying down, exercising, etc.) that are more robust to changes in the quality of the sensor measurements or sensor signal.

Figure 1:
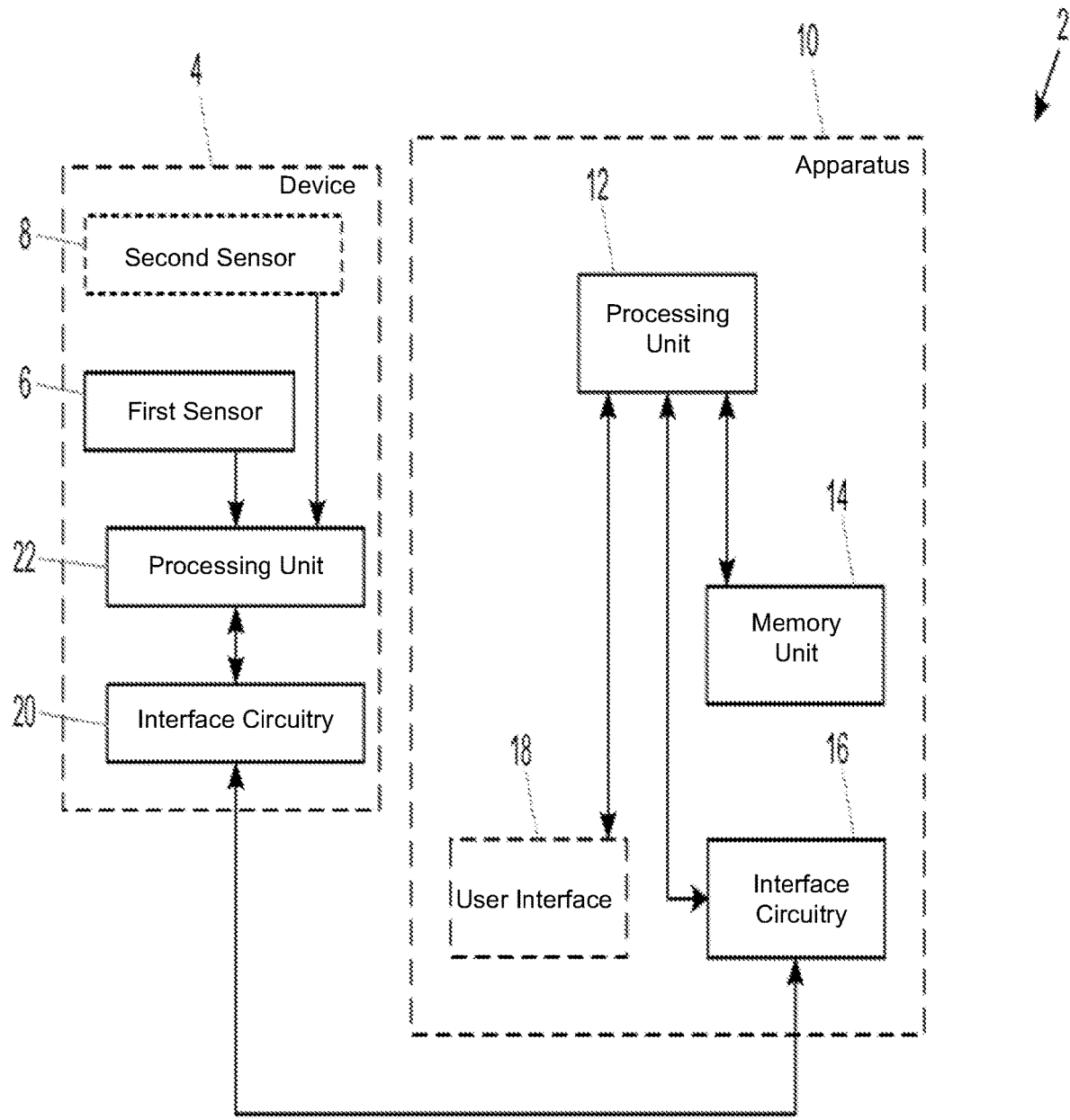
FIG. 1 is a block diagram illustrating a system comprising an apparatus and device according to an exemplary embodiment.

FIG. 1 illustrates a system 2 according to an exemplary embodiment of the teachings presented herein. In this embodiment the system 2 comprises a device 4 that is carried or worn by the subject and that includes a first sensor 6 for measuring some aspect of the subject over time. In some embodiments, the device 4 can include a second sensor 8 that is a different type of sensor to the first sensor 6 that also measures some aspect of the subject over time. In further embodiments, the device 4 can include further sensors in addition to the first sensor 6 and second sensor 8.

Each sensor 6, 8 generates and outputs a respective signal representing measurements of the respective aspect of the subject over time. Each measurement signal can comprise a time series of measurements (samples), and the measurement signal can therefore relate to the measurements in a time period. Each sensor 6, 8 can use any desired sampling frequency, for example 50 measurements per second (50 Hz), 64 Hz or 100 Hz. Different sensors may run at different sampling rates. For example, another sensor may be sampled at 2 Hz, or 4 Hz, or 0.4 Hz, or 1 Hz.

As the system 2 is to evaluate the movement of the subject, typically at least one sensor 6, 8 in the system is a sensor that directly or indirectly measures the movements of the subject over time. For example, the sensors 6, 8 can be any of an accelerometer, an air pressure sensor, a magnetometer, a gyroscope, a satellite positioning system (SPS) receiver (e.g. a GPS receiver, a GLONASS receiver, a Galileo positioning system receiver, etc.), and a pressure sensor that can be positioned in the subject's shoe (or in each shoe) or other footwear to measure the pressure that the foot is applying to the ground (since these measurements can be indicative of footsteps). A sensor that directly or indirectly measures the movements of the subject over time is referred to herein as a "movement sensor", and the movement sensor outputs a "movement signal" representing "movement measurements".

Although the system 2 typically includes at least one movement sensor, it will be appreciated that movement of the subject can also be evaluated using measurements from one or more sensors that do not directly or indirectly measure movement of the subject, and such sensors can be provided in addition to, or alternatively to, one or more movement sensors. For example, a skin conductivity sensor can be used to provide measurements of skin conductivity that can be evaluated by a fall detection algorithm to determine if the subject is experiencing a stress response (for example which could be expected following a fall). Similarly, a photoplethysmography (PPG) sensor can be used to provide measurements of blood volume over time at the PPG sensor location on the body, with the PPG signal representing a subject's pulse or heartbeat. The PPG signal can also be evaluated by a fall detection algorithm to determine if the subject is experiencing a stress response, or by a walking detection or assessment algorithm to determine if the subject is physically exerting themselves or is generally inactive (e.g. sedentary). Those skilled in the art will be aware of other types of physiological characteristic sensors that can be used in evaluating the movement of a subject according to the techniques described herein.

Several embodiments of the system 2 are envisaged having particular combinations of sensor types. In a first series of embodiments, the system 2 comprises a single sensor (the first sensor 6), and the first sensor 6 is an accelerometer. In a second series of embodiments, the first sensor 6 is an accelerometer, and the second sensor 8 is an air pressure sensor or a gyroscope. In a third series of embodiments, the first sensor 6 is an accelerometer, the second sensor 8 is one of an air pressure sensor and a gyroscope, and the system 2 further comprises a third sensor that is the other one of the air pressure sensor and gyroscope. In a fourth series of embodiments, the first sensor 6 is an air pressure sensor, and the second sensor 8 is one of an accelerometer or a gyroscope. In a fifth series of embodiments, the first sensor 6 is an air pressure sensor, the second sensor 8 is one of an accelerometer and a gyroscope, and the system 2 further comprises a third sensor that is the other one of the accelerometer and gyroscope. In any of these embodiments, the system 2 could further comprise a sensor such as a skin conductivity sensor and/or a PPG sensor.

In the case of an accelerometer, the accelerometer can generate and output a movement signal that contains a plurality of acceleration measurement samples representing the movements of the subject at a plurality of time instants. The accelerometer is typically an accelerometer that measures accelerations in three dimensions, and the movement signal generated by the accelerometer can include respective measurements representing the accelerations in each of the three dimensions. For example, the accelerometer can output respective measurement signals for each of an x-axis, y-axis and z-axis of a Cartesian coordinate system. Typically, the coordinate system of the accelerometer is local, meaning it moves with the physical orientation of the accelerometer. By estimating the orientation of the accelerometer, the signals can be transformed to another, e.g. global, coordinate system. In particular, the acceleration in the vertical direction is of interest when performing fall detection or measuring the quality of a STS transfer.

In the case of an air pressure sensor, the air pressure sensor can include any type of sensor for measuring air pressure or changes in air pressure. The air pressure sensor can generate and output an air pressure signal representing measurements of the environmental air pressure or changes in air pressure at the air pressure sensor. Changes are typically determined as the difference between a current air pressure measurement and an air pressure measurement a few seconds before. Typical values over which a change in air pressure can be determined are 2, 5 and 12 seconds. The air pressure signal can comprise a time series of air pressure measurements (samples) and the air pressure signal can therefore relate to the air pressure or changes in air pressure in a time period. The signals might be filtered to yield a more smoothed version of the original time series. The air pressure sensor can use any desired sampling frequency, for example 1 Hz or 50 Hz. In other embodiments a microphone might be used. Typically, the microphone is sampled at 16 kHz or higher frequencies.

Returning to FIG. 1, the system 2 also comprises an apparatus 10 that receives the sensor measurements or sensor signals from the sensor(s) 6, 8 in the device 4 and analyses the measurements or signals to evaluate the movement of the subject, e.g. to detect a fall, to determine a fall risk, or evaluate a walking ability and quality of the subject.

The device 4 can be in any form suitable enabling the subject to carry or wear the device 4. For example, the device 4 may be in the form of a watch or smartwatch, a smartphone, a bracelet, a pendant, a necklace, a chest band, integrated into an item of clothing, etc. In some embodiments, as shown in FIG. 1, the apparatus 10 can be separate from the device 4. In these embodiments, the apparatus 10 can be any type of electronic device or computing device that can communicate with, or otherwise receive the measurements or sensor signal(s) directly or indirectly from, the device 4. For example the apparatus 10 can be, or be part of, a computer, a laptop, a tablet, a smartphone, a smartwatch, etc., and as such may be an apparatus that is present or used in the home or care environment of the subject. In other implementations, the apparatus 10 can be an apparatus that is remote from the subject, and remote from the home or care environment of the subject. For example, the apparatus 10 can be a server, for example a server in a data centre (also referred to as being 'in the cloud'). In alternative embodiments, the apparatus 10 (and in particular the functionality of the apparatus 10 as described herein) can be integral with the device 4. Therefore the apparatus 10 can also be carried or worn by the subject as part of the device 4.

The apparatus 10 includes a processing unit 12 that controls the operation of the apparatus 10 and that can be configured to execute or perform the methods described herein. In particular, the processing unit 12 can obtain the measurements/signal(s) and process them to evaluate the movement of the subject. The processing unit 12 can be implemented in numerous ways, with software and/or hardware, to perform the various functions described herein. The processing unit 12 may comprise one or more microprocessors or digital signal processor (DSPs) that may be programmed using software or computer program code to perform the required functions and/or to control components of the processing unit 12 to effect the required functions. The processing unit 12 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 12 is connected to a memory unit 14 that can store data, information and/or signals (including movement measurements and/or air pressure measurements) for use by the processing unit 12 in controlling the operation of the apparatus 10 and/or in executing or performing the methods described herein. In some implementations the memory unit 14 stores computer-readable code that can be executed by the processing unit 12 so that the processing unit 12 performs one or more functions, including the methods described herein. In particular embodiments, the program code can be in the form of an application for a smartwatch, a smartphone, tablet, laptop or computer. The memory unit 14 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM) and electrically erasable PROM (EEPROM), implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

In the embodiment of the system 2 shown in FIG. 1, as the apparatus 10 is separate from the device 4 that includes the first sensor 6 and (optional) second sensor 8, the apparatus 10 also includes interface circuitry 16 for enabling a data connection to and/or data exchange with other devices, including device 4, and optionally any one or more of servers, databases, user devices, and other sensors. The connection may be direct or indirect (e.g. via the Internet), and thus the interface circuitry 16 can enable a connection between the apparatus 10 and a network, such as the Internet, or between the apparatus 10 and device 4, via any desirable wired or wireless communication protocol. For example, the interface circuitry 16 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.). In the case of a wireless connection, the interface circuitry 16 (and thus apparatus 10) may include one or more suitable antennas for transmitting/receiving over a transmission medium (e.g. the air). Alternatively, in the case of a wireless connection, the interface circuitry 16 may include means (e.g. a connector or plug) to enable the interface circuitry 16 to be connected to one or more suitable antennas external to the apparatus 10 for transmitting/receiving over a transmission medium (e.g. the air). The interface circuitry 16 is connected to the processing unit 12 to enable information or data received by the interface circuitry 16 to be provided to the processing unit 12, and/or information or data from the processing unit 12 to be transmitted by the interface circuitry 16.

The interface circuitry 16 can be used to receive measurements/signal generated by the first sensor 6 and measurements/signal generated by the second sensor 8, and any further sensor(s) (if present in the system 2).

In some embodiments, the interface circuitry 16 can be used to output a result of the processing by the processing unit 12, for example an indication of the evaluation of the movement of the subject (e.g. an indication that the subject has suffered a fall, or an indication of the type of movement or activity that the subject is performing).

In some embodiments, the apparatus 10 comprises a user interface 18 that includes one or more components that enables a user of apparatus 10 (e.g. the subject, or a care provider for the subject) to input information, data and/or commands into the apparatus 10 (e.g. for starting or enabling the evaluation of movement according to the techniques described herein), and/or enables the apparatus 10 to output information or data to the user of the apparatus 10. An output may be an audible, visible and/or tactile indication that the subject has traversed stairs, for example. The user interface 18 can comprise any suitable input component(s), including but not limited to a keyboard, keypad, one or more buttons, switches or dials, a mouse, a track pad, a touchscreen, a stylus, a camera, a microphone, etc., and the user interface 18 can comprise any suitable output component(s), including but not limited to a display screen, one or more lights or light elements, one or more loudspeakers, a vibrating element, etc.

It will be appreciated that a practical implementation of apparatus 10 may include additional components to those shown in FIG. 1. For example the apparatus 10 may also include a power supply, such as a battery, or components for enabling the apparatus 10 to be connected to a mains power supply.

As noted above, the first sensor 6 and second sensor 8 (if present) are part of device 4, which is separate from the apparatus 10 in the embodiment shown in FIG. 1. In order for the measurements/signal(s) to be communicated from the device 4 to the apparatus 10, the device 4 comprises interface circuitry 20. The interface circuitry 20 may be implemented in a similar way to the interface circuitry 16 in the apparatus 10.

In some embodiments, the device 4 can also include a processing unit 22 for controlling the operation of the device 4. This processing unit 22 can also be used to perform some pre-processing of the measurements/signal(s) before they are communicated to the apparatus 10, for example the measurements can be filtered to reduce or remove a noise component or artefacts. The processing unit 22 may be implemented in a similar way to the processing unit 12 in the apparatus 10.

It will be appreciated that a practical implementation of device 4 may include additional components to those shown in FIG. 1. For example the device 4 may also include a power supply, preferably a battery so that the device 4 is portable, or components for enabling the device 4 to be connected to a mains power supply.

In alternative embodiments of the system 2 where the apparatus 10 is part of the device 4, it will be appreciated that only one processing unit 12/22 may be present, and interface circuitry is not required to communicate the measurements/signal(s) to the processing unit 12.

As noted above, movement of a subject can be evaluated by an algorithm that determines a number of features from measurements of the subject (e.g. measurements of movement, measurements of other characteristics such as skin conductivity, heart rate, etc.). Some of these features may be sensitive to artefacts in the measurements or measurement signal(s), meaning that the feature values may be influenced or affected by these artefacts. In that case, the reliability of the algorithm may decrease if artefacts are present. These artefacts may be due to the quality of the sensor, or due to poor calibration of the sensor, or the calibration of the sensor drifting over time.

Figure 2:
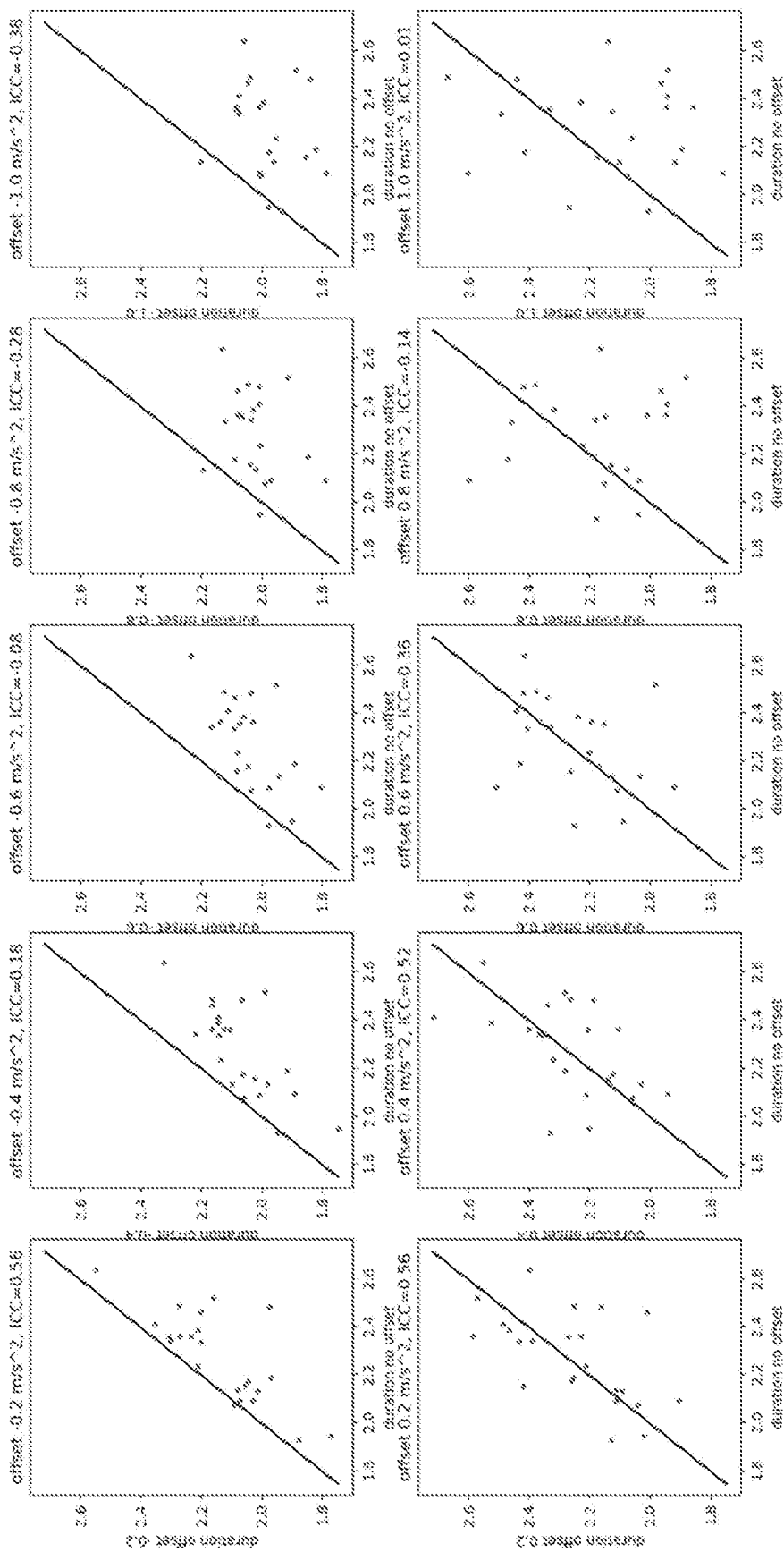
FIG. 2 is a set of graphs illustrating how a duration of an STS transfer is affected by various offsets in acceleration measurements.
Figure 3:
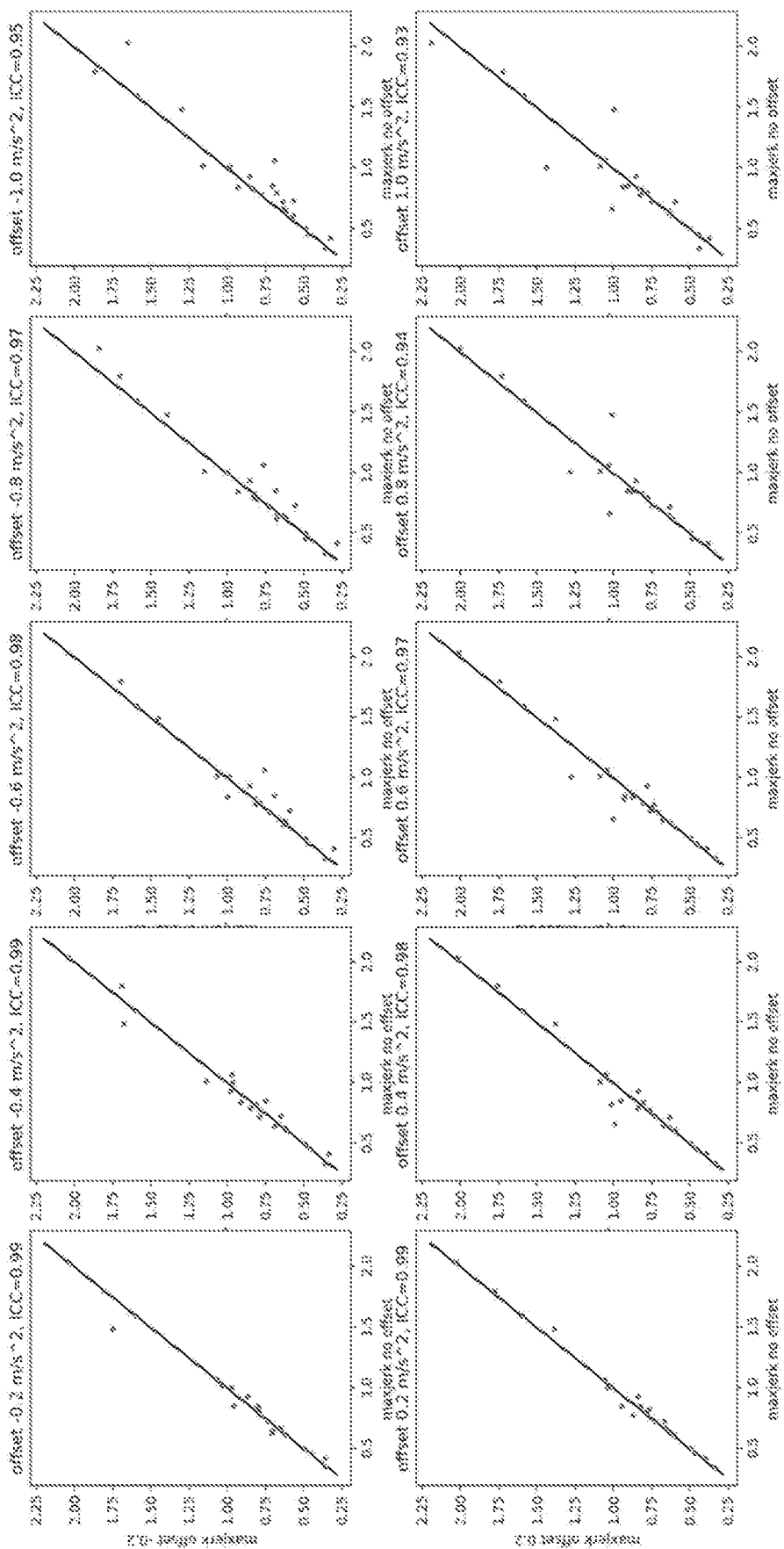
FIG. 3 is a set of graphs illustrating how maximum jerk of an STS transfer is affected by various offsets in acceleration measurements.
Figure 4:
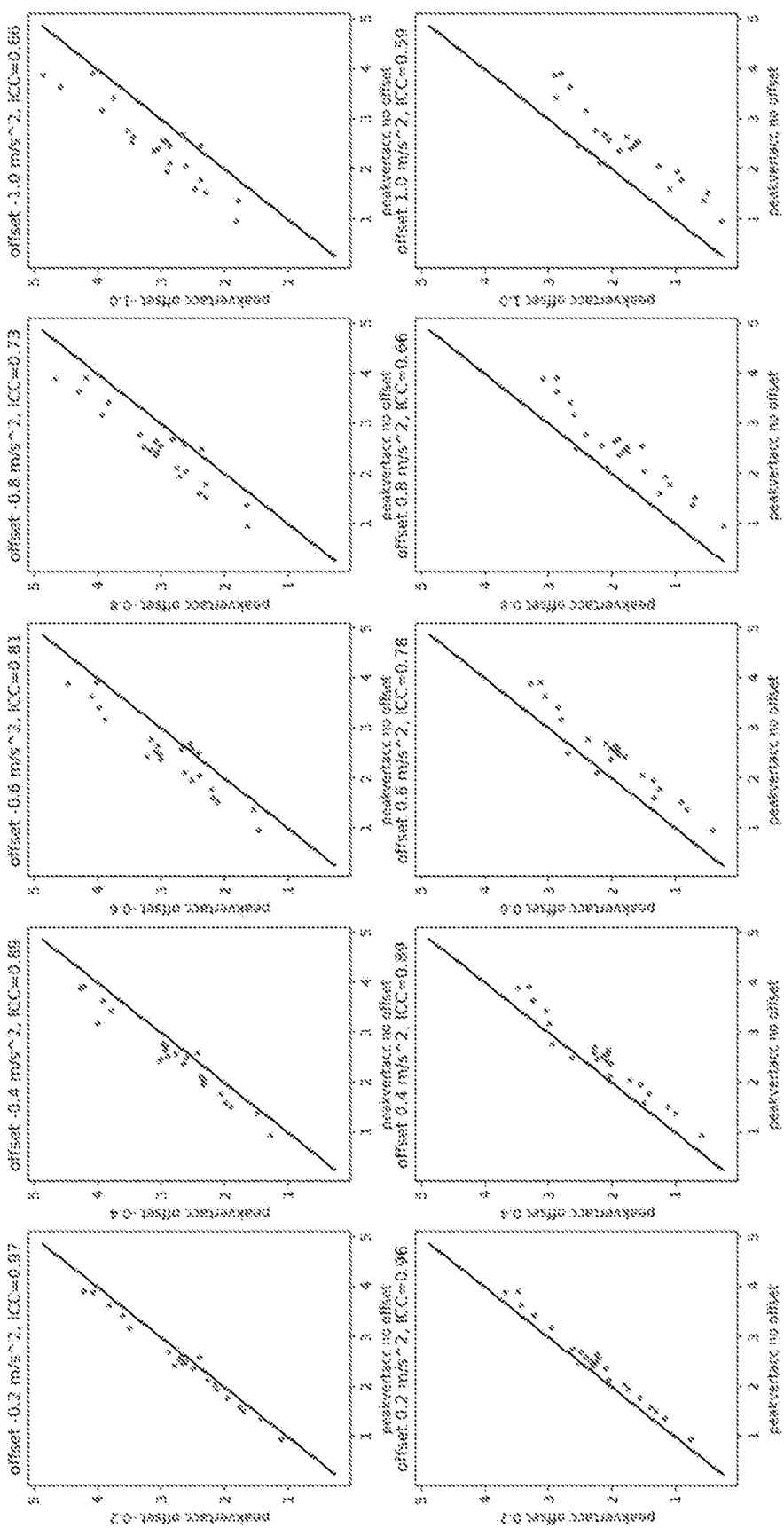
FIG. 4 is a set of graphs illustrating how peak vertical acceleration of an STS transfer is affected by various offsets in acceleration measurements.
Figure 5:
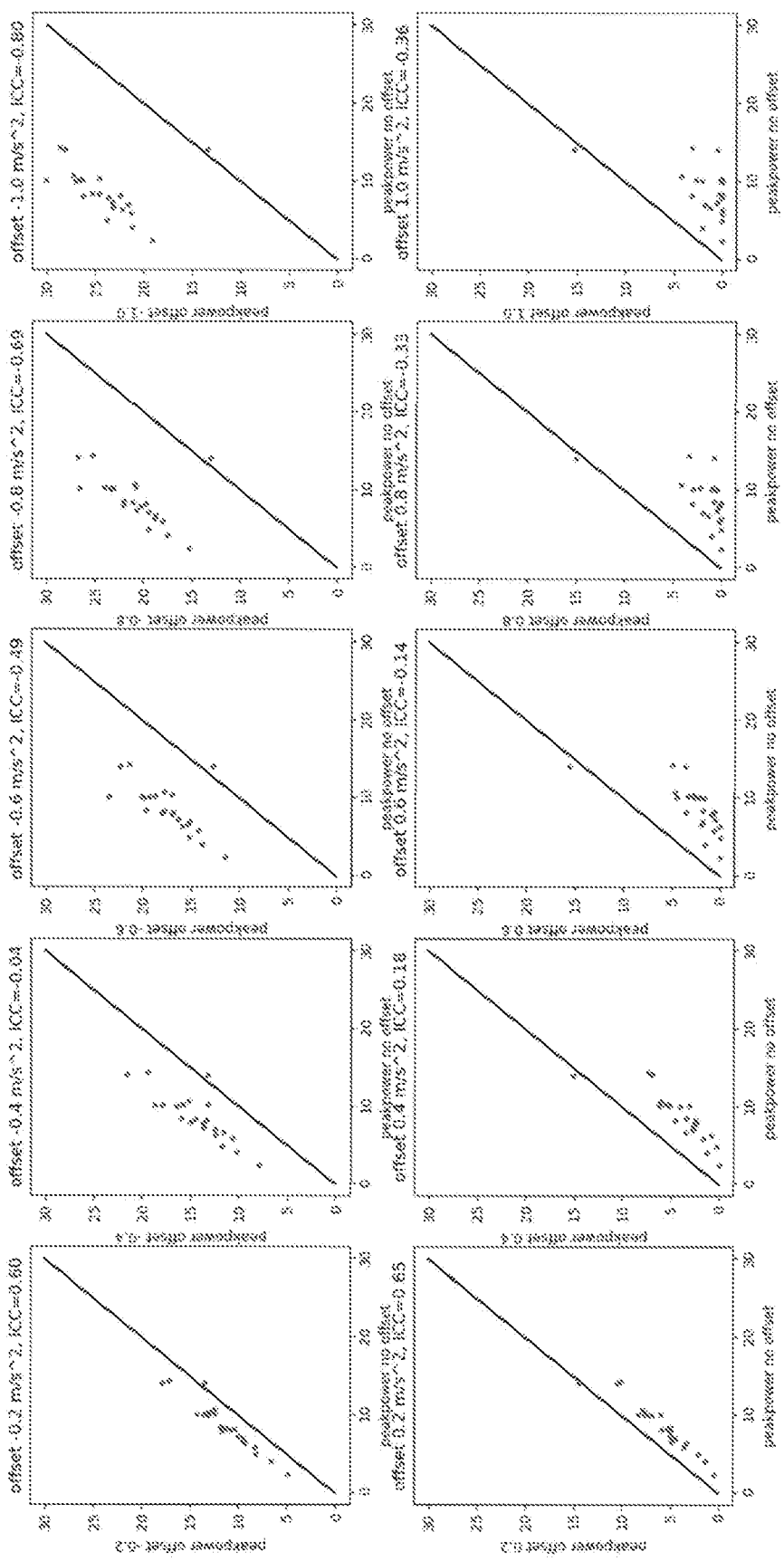
FIG. 5 is a set of graphs illustrating how peak power of an STS transfer is affected by various offsets in acceleration measurements.

The graphs in FIGS. 2-5 illustrate how various features relating to an STS transfer that can be determined from acceleration measurements are affected by offset in the acceleration measurements. In particular, FIG. 2 is a set of graphs illustrating how a duration of an STS transfer is affected by various offsets in acceleration measurements, FIG. 3 is a set of graphs illustrating how maximum jerk of an STS transfer is affected by various offsets in acceleration measurements, FIG. 4 is a set of graphs illustrating how peak vertical acceleration of an STS transfer is affected by various offsets in acceleration measurements, and FIG. 5 is a set of graphs illustrating how peak power of an STS transfer is affected by various offsets in acceleration measurements. Each of FIGS. 2-5 include a series of graphs, with each graph representing the feature values for a particular offset ranging from −1.0 ms$^{-2}$ up to 1.0 ms$^{-2}$ in 0.2 ms$^{-2}$ increments (excluding 0 offset). Each graph is a plot of feature values averaged over a number of STS events detected per subject, with the values on the x-axis showing the reference values for feature value obtained using the originally collected measurements, and the values on the y-axis showing the feature values when simulating an offset as given in the title of that graph to the measurements along the x-axis of the accelerometer (which in these examples was the measurement axis of the accelerometer that is approximately vertical when the device 4 (in the form of a pendant or necklace) is hanging freely, and also when the subject wearing the device 4 is upright—the vertical axis has higher sensitivity to offset for the features that are derived from the accelerometer measurements). Each graph shows an associated ICC value that represents a measure of agreement between the feature values (i.e. a measure of the agreement between the feature values obtained when the offset is present and the feature values obtained in the absence of an offset, as represented by the line in each graph), with an ICC value of 1 indicating perfect agreement (i.e. the presence of the specified offset does not affect the feature value) and lower values indicating less agreement (i.e. the presence of the specified offset affects the feature value, with an ICC of 0 indicating no agreement).

It can be seen in FIG. 2 that the STS transfer duration has an ICC value of 0.56 with an offset of just ±0.2 ms$^{-2}$, with the ICC decreasing further with larger offsets. Thus, the STS transfer duration is not robust against acceleration offset. This is also the case for peak power in an STS transfer (FIG. 5). For the maximum jerk during an STS transfer (FIG. 3), the ICC value is only 0.95 even with an offset of ±1.0 ms$^{-2}$, so the maximum jerk is robust against offsets of at least ±1.0 ms$^{-2}$, and so the maximum jerk is reliable even in the presence of significant offsets in the acceleration measurements. For peak vertical acceleration (FIG. 4), the ICC value is 0.89 with an offset of ±0.4 ms', so the peak vertical acceleration can be considered as robust against offsets of up to ±0.4 ms$^{-2}$. With offsets greater than ±0.4 ms$^{-2}$, the ICC value is less than 0.9.

Thus, it can be seen in FIGS. 2-5 that some of the features relating to a STS transfer are sensitive to drift in the acceleration measurements or acceleration signal, and the reliability of an algorithm that detects the occurrence of an STS transfer or an algorithm that evaluates the performance of an STS transfer may decrease if the algorithms use the above features and drift is present.

However, an approach in which the movement evaluation algorithm only uses features that are not sensitive to artefacts is undesirable as signal artefacts and quality issues may not be present all of the time, present a majority of the time, or present at all, and the features that are not used in the algorithm may have provided useful information for evaluating the movement and generally improve the reliability of the algorithm when artefacts are not present. Therefore an alternative approach is required that is able to provide reliable movement evaluation algorithm outputs both in the presence of quality issues with a signal from a sensor and when the quality of the signal is high (i.e. high quality) or sufficient.

It is known that the accuracy of some movement evaluation algorithms can be derived by considering the likelihoods of observing a value set for a certain feature set. In the case of a fall detection algorithm, the feature set can include features such as height change, impact and orientation change. These features are estimated from the sensor signals (e.g. acceleration signal) and the values of these features cover a typical range, depending on whether the measurements are of movements relating to a fall or a non-fall.

Figure 6B:
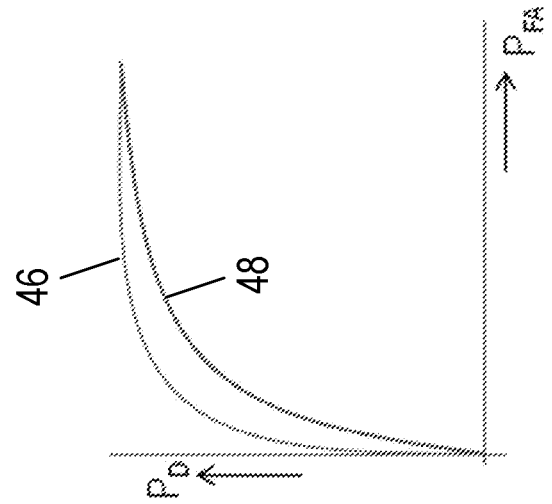
FIG. 6(b) is a graph illustrating receiver operating characteristics, ROC, curves.

FIG. 6 includes two graphs relating to a fall detection algorithm, with the graph in FIG. 6($a$) illustrating probability distributions of feature values $\bar{x}$ occurring for a fall and a non-fall, and the graph in FIG. 6($b$) illustrating a receiver operating characteristics (ROC) curve. The horizontal axis of the graph in FIG. 6($a$) depicts the probability of the feature values $\bar{x}$ (which is a vector, to represent values for multiple features) given the movement is a fall or not a fall (e.g. the movement is an activity of daily living (ADL), e.g. walking down stairs). The probability distribution 30 is the probability to measure the feature values $\bar{x}$ in case the event is a fall (denoted P($\bar{x}$|Fall)), and the probability distribution 32 is the probability to measure the feature values $\bar{x}$ in case the event is not a fall (denoted P($\bar{x}$|ADL)). These probability distributions 30, 32 are also known as the likelihoods that a given event with measured feature set $\bar{x}$ is a fall, or is not a fall/is an ADL, respectively.

The logarithm of the ratio of two probabilities constitutes the Log Likelihood Ratio (LLR), i.e.:

$$LLR(x) = \log\left[\frac{P(x|\text{Fall})}{P(x|ADL)}\right] \quad (1)$$

When the LLR is above a threshold the fall detection algorithm determines that the feature values result from a fall, and from a non-fall when the LLR is below the threshold. This is known as the Likelihood Ratio Test (LRT). In the exemplary case of the illustrated likelihood curves 30, 32, this LRT is equivalent to testing whether the vector $\bar{x}$ is 'below' or 'above' a boundary (hyper)plane, denoted in FIG. 6($a$) as $\bar{\theta}_{\bar{x}}$. It will be appreciated that since $\bar{x}$ is a vector, 'above' and 'below' represent the values of $\bar{x}$ being either side of the hyperplane boundary $\bar{\theta}_{\bar{x}}$.

More generally, the LRT is given by:

$$LRT: \frac{P(x|\text{Fall})}{P(x|ADL)} > \theta_\alpha = \frac{P(\bar{\theta}_{\bar{x}}|\text{Fall})}{P(\bar{\theta}_{\bar{x}}|ADL)} \quad (2)$$

where $\theta_\alpha$ is the likelihood ratio when $\bar{x}$ is at the boundary $\bar{\theta}_{\bar{x}}$.

Given an event with feature values $\bar{x}$, the LRT decides whether the event is considered a fall or a non-fall. Effectively, the hyperplane boundary $\bar{\theta}_{\bar{x}}$ defines this outcome for the given feature values $\bar{x}$, depending on the location of $\bar{x}$ relative to $\bar{\theta}_{\bar{x}}$.

It can be seen that there is considerable overlap between the two distributions 30, 32 where feature values $\bar{x}$ could relate to a fall or non-fall. This overlapping region is indicated by bracket 34. The overlap of the distributions 30, 32 and the hyperplane boundary $\bar{\theta}_{\bar{x}}$ results in a region 38 at the right of $\bar{\theta}_{\bar{x}}$ and below curve 30 whose area represents the fraction of true positives, TP (i.e. the fraction of fall events where the feature values $\bar{x}$ are correctly identified as a fall), a region 40 at the left of $\bar{\theta}_{\bar{x}}$ and below curve 32 whose area represents the fraction of true negatives, TN (i.e. the fraction of non-fall events where the feature values $\bar{x}$ are correctly identified as a non-fall/ADL), a region 42 at the right of $\bar{\theta}_{\bar{x}}$ and below curve 32 whose area represents the fraction of false positives, FP (i.e. the fraction of non-fall events where the feature values $\bar{x}$ are incorrectly identified as a fall) and a region 44 at the left of $\bar{\theta}_{\bar{x}}$ and below curve 30 whose area represents the fraction of false negative, FN (i.e. the fraction of fall events where the feature values $\bar{x}$ are incorrectly identified as a non-fall/ADL).

Thus, by shifting (changing) the decision threshold (the boundary plane $\bar{\theta}_{\bar{x}}$), the size of these regions 38, 40, 42 and 44 change reflecting a change in the TPs, TNs, FPs and FNs occurring. Putting the TP and FP together while varying $\bar{\theta}_\alpha$, while varying $\bar{\theta}_{\bar{x}}$, yields the ROC curves shown in FIG. 6(b). The ROC curves plot the TPs, i.e. the fraction, or probability, of correct detections (denoted $P_D$) against the FPs, i.e. the fraction, or probability, of false alarms (denoted $P_{FA}$) for varying threshold values (i.e. varying boundary planes). At a high threshold (i.e. $\bar{\theta}_{\bar{x}}$ is at the right in FIG. 6(a) and TP and FP are at the lower left part of the ROC curve 46 and 48 in FIG. 6(b)) there are (nearly) no false alarms, but also only a few falls detected. With a lower threshold (moving $\bar{\theta}_{\bar{x}}$ to the left in FIG. 6(a)) more falls are detected, and the TP rate rises, and the FP rate rises a little (moving along the curve 46 and 48 towards the left upper corner). With an even lower threshold, more FPs occur and the ROC curve bends to the right.

Thus, a more accurate detection algorithm results the closer the ROC curve is to the left upper corner of the plot, and this is where the two likelihood curves 30, 32 have smaller overlap. This happens when the curves 30 and 32 are more distant from each other (e.g. their means are more separated) and when they are more confined (e.g. their variance is smaller).

Figure 6A:
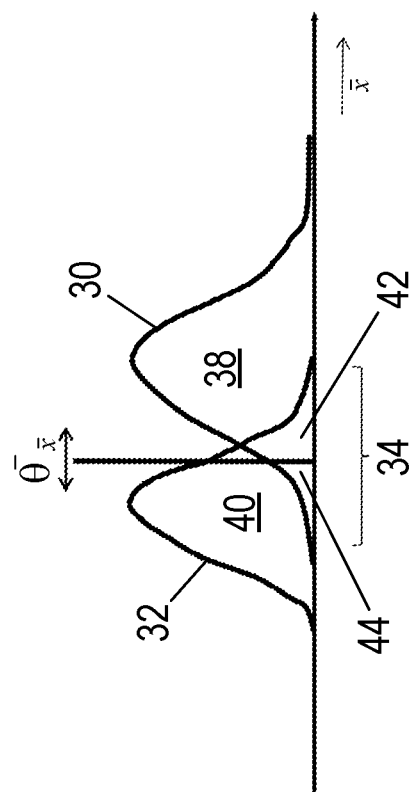
FIG. 6(a) is a graph illustrating respective probability distributions of feature values occurring for a non-fall and a fall.

In FIG. 6(a), the likelihood curves 30, 32 are composed by the individual contributions of each of a plurality of features. However, the features can be considered individually, and similar likelihood curves can be drawn (in which case the axis x is a scalar, assuming the feature entity is a scalar quantity).

In order to describe the effect when a sensor signal is or gets more noisy, the following model is introduced. The model does not necessarily provide an accurate quantification of the detection algorithm, but it provides an instructive way to describe its behaviour with respect to the signal noise levels. The two likelihood curves 30 and 32 (now meant per separate feature) are characterized by their mean (denoted $\mu_{Fall}$ and $\mu_{ADL}$ respectively) and variance var=$\sigma^2$, where for simplicity of explanation it is assumed the variance is the same for both distributions (or their average can be used, for example).

Then, the contribution of each feature to the accuracy of the detection algorithm can be modelled by the distance $d\mu$:

$$d\mu = |\mu_{Fall} - \mu_{ADL}| \quad (3)$$

between the two means of its likelihood curves and the variance var=$\sigma^2$ of each feature. Likewise, the distance and variance of the overall (composed) likelihood curves can be modelled. When the detection accuracy is large (high)—curve 46 in FIG. 6(b)—the ratio $$\frac{|\mu_{Fall} - \mu_{ADL}|}{\sigma} \quad (4)$$

is also large. The curves 30 and 32 have little overlap.

In the explanation below that relates to a fall detection algorithm that can use features derived from an air pressure signal, the following subscripts are used:
- 0: to denote the overall composed likelihood distribution (curve) excluding the air pressure-related features;
- 10: to denote the (possibly composed) distribution of the air pressure-related features in ideal (noiseless) conditions (i.e. so there is no (additional) noise in the air pressure signal); and
- 11: to denote the (possibly composed) distribution of the air pressure-related features in the case of noisy conditions (i.e. so there is noise in the air pressure signal).

The effect of the noise being present in the air pressure signal is that the curves 30 and 32 in FIG. 6(a) widen, but their means do not change:

$$d\mu_{11} = d\mu_{10} \quad (5)$$

$$\sigma_{11} > \sigma_{10} \quad (6)$$

The accuracy of the fall detection algorithm without including the air pressure-related features is reflected by:

$$\frac{d\mu_0}{\sigma_0} \quad (7)$$

When including the air pressure-related features, in the ideal conditions, the accuracy improves, so:

$$\frac{d\mu_0 + d\mu_{10}}{\sqrt{\sigma_0^2 + \sigma_{10}^2}} > \frac{d\mu_0}{\sigma_0} \quad (8)$$

Similarly, when the air pressure is noisy, the accuracy degrades, so:

$$\frac{d\mu_0 + d\mu_{11}}{\sqrt{\sigma_0^2 + \sigma_{11}^2}} < \frac{d\mu_0}{\sigma_0} \quad (9)$$

Rewriting equation (8) leads to:

$$\sigma_{10}^2 < \sigma_0^2 * \left[\left(\frac{d\mu_{10}}{d\mu_0}\right)^2 + \frac{d\mu_{10}}{d\mu_0}\right] = \sigma_T^2 \quad (10)$$

where $\sigma_T^2$ is a threshold variance for the air pressure signal.

Similarly, rewriting equation (9), and using equation (5), leads to:

$$\sigma_{11}^2 > \sigma_0^2 * \left[\left(\frac{d\mu_{10}}{d\mu_0}\right)^2 + \frac{d\mu_{10}}{d\mu_0}\right] = \sigma_T^2 \quad (11)$$

It will be noted that equations (10) and (11) are consistent with equation (6).

Equation (11) motivates part of the solutions provided by the techniques described herein. Firstly, a value of $\sigma_T^2$ can be found, for example by simulation, or this threshold can be set by other means.

Secondly, the variance $\sigma_{Press}^2$ in the air pressure signal can be determined, and if:

$$\sigma_{Press}^2 < \sigma_T^2 \quad (12)$$

then the fall detection algorithm can use the air pressure signal and features derived from the air pressure signal. If $$\sigma_{Press}^2 > \sigma_T^2 \quad (13)$$

then the air pressure-based features can be excluded from (not used in) the fall detection algorithm.

The threshold $\sigma_T^2$ can be found in a number of different ways. For example it can be found by observing the area under the curve (AUC) of the ROC curve, by observing the TP at a chosen FP ratio, and/or by observing the TP rate and the FP rate. In all cases, these metrics are measured when excluding the air pressure signal (in this exemplary description) and when including the air pressure signal while adding an increasing level of noise to that signal. The threshold $\sigma_T^2$ is reached when the metric equals the value from the 'excluded' measurement.

Another view of the effects when the signals are increasingly noisy is as follows. For a given detector design, i.e. for given LLR functions, as obtained by equation (1), the LLR values are plotted for several fall and ADL events. The resulting plot is a scatter plot, as exemplified in each of FIG. 7(a) and FIG. 7(b). In FIGS. 7(a) and 7(b) the LLR values for two features, x0 and x1, are shown. The features can be computed from different sensor signals, but may alternatively be derived from the same signal. In this example, feature x0 degrades when the sensor signal becomes more noisy. In the plots a single circle/ellipse 50 is shown to indicate the location where the fall events are concentrated, and a single circle/ellipse 52 is shown to indicate the 'centre of gravity' of the ADL events, but strictly for every event a respective point should be shown, or (in 3D) a smoothed bell shape reflecting the density of points, or contour lines expressing the same. The density expresses the combined LLR of x0 and x1, for example, as in a Naïve Bayesian approach, their sum: LLR(x0)+LLR(x1).

In FIG. 7(a) the decision threshold $\overline{\theta}_\alpha$ is depicted by line 54 that generally runs between the circles 50, 52. The decision threshold determines whether an event is classified as a fall or an ADL. When the combined LLR of x0 and x1 exceeds the threshold, the event is inferred to be a fall, and otherwise it is inferred to be an ADL. The combined LLR of x0 and x1 is given by:

$$\text{combined } LLR = w0 \cdot z0 + w1 \cdot z1 \quad (14)$$

where z0 and z1 are the LLRs of x0 and x1 respectively, and w0 and w1 are respective weights (weightings) for z0 and z1. The threshold line 54 corresponds to where the combined LLR in equation (14) equals the decision threshold $\overline{\theta}_\alpha$.

In the case of the Naïve Bayesian approach, the weights each have value one (i.e. w0=w1=1).

When x0 gets more noisy, due to the sensor signal it is derived from becoming more noisy, the density plot widens in the direction of the x0-axis, as depicted in FIG. 7(b). When keeping the same decision threshold $\overline{\theta}_\alpha$, depicted by dashed line 54, an increase in False Alarms (FP) can be seen in area 56 which are ADL events that lie above the decision threshold and so will be classified as falls. In a similar way, there is also a decrease in the detection sensitivity TP (not explicitly marked in FIG. 7(b)).

However, by adapting the weighting of the features in the combined LLR in equation (14), and/or adapting the threshold $\overline{\theta}_\alpha$, the decision boundary shifts (as indicated by line 58) and a better overall performance is obtained. In this case the combined LLR is given by:

$$\text{combined } LLR' = w0' \cdot z0 + w1' \cdot z1 \quad (15)$$

where w0' and w1' are respective weights (weightings) for z0 and z1. The threshold line 58 is where the combined LLR' in equation (15) equals the decision threshold $\overline{\theta}_\alpha'$. For the line 58 to be shifted compared to line 54, one or more of the weighting factors w0', w1' and decision threshold $\overline{\theta}_\alpha'$ should be different (i.e. one or more of w0'≠w0, w1'≠w1 and $\overline{\theta}_\alpha'$ ≠ $\overline{\theta}_\alpha$). In some cases equation (15) can be normalised such that one of these values stays constant. It will be noted that using the adjusted values in the non-noisy case would be suboptimal in that situation.

The weighting factors can be obtained in several ways. One would be to measure the increment in variance of the LLR values (say, the width of the ellipse), and let the weighting factor decrease inversely proportional to this increase: w'=w·width/width' (where prime indicates the 'with noise' situation). The increment can also be estimated from the relative increase in noise level in the signal, assuming it is valid to apply a first order estimation of how the likelihood distribution will widen. Yet another way would be to apply regression on the set of scatter plots to find the best fit through the plots.

Figure 8:
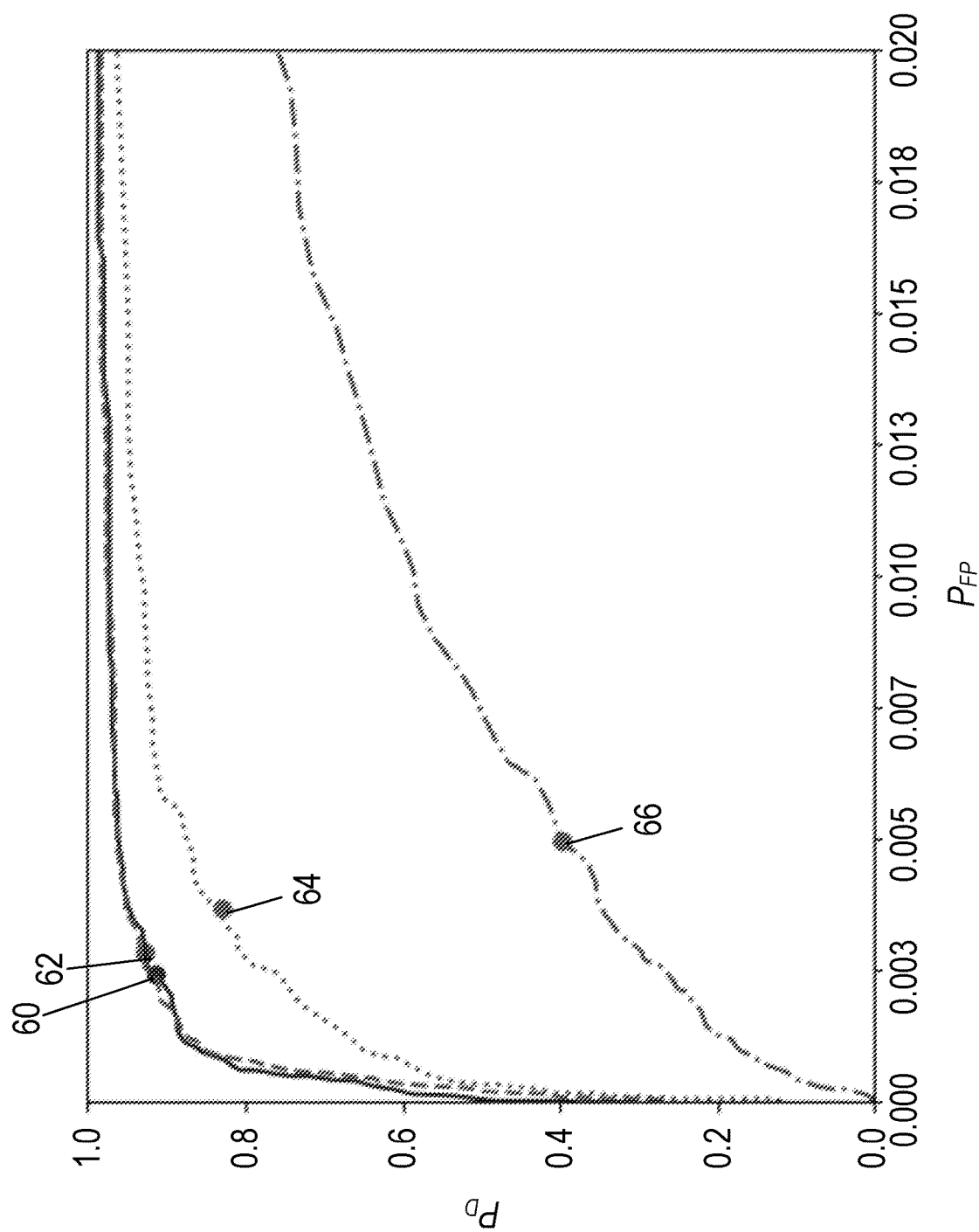
FIGS. 8-10 show respective plots of ROC curves for different configurations of a fall detection algorithm for different noise levels in an air pressure signal.
Figure 9:
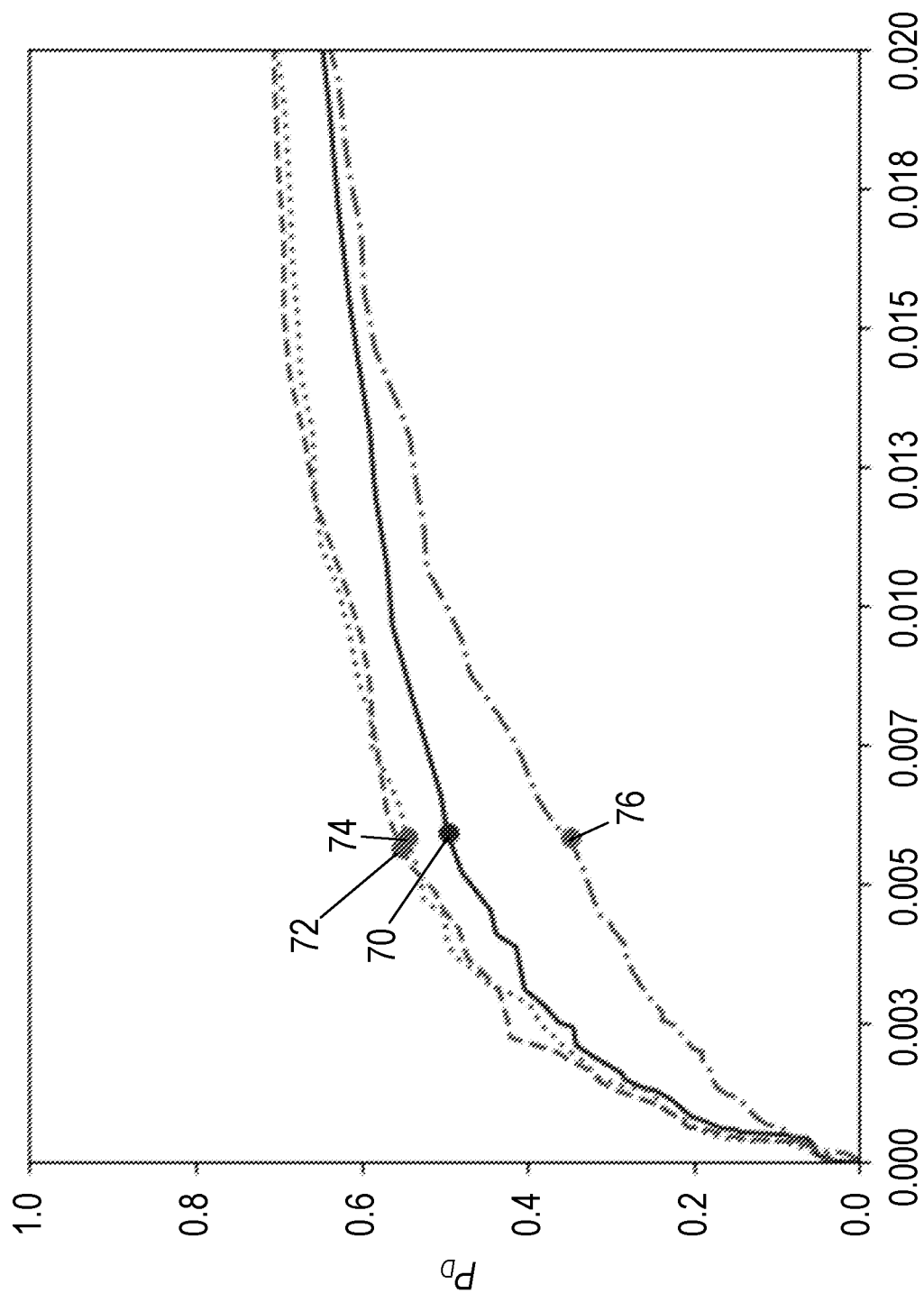
Figure 10:
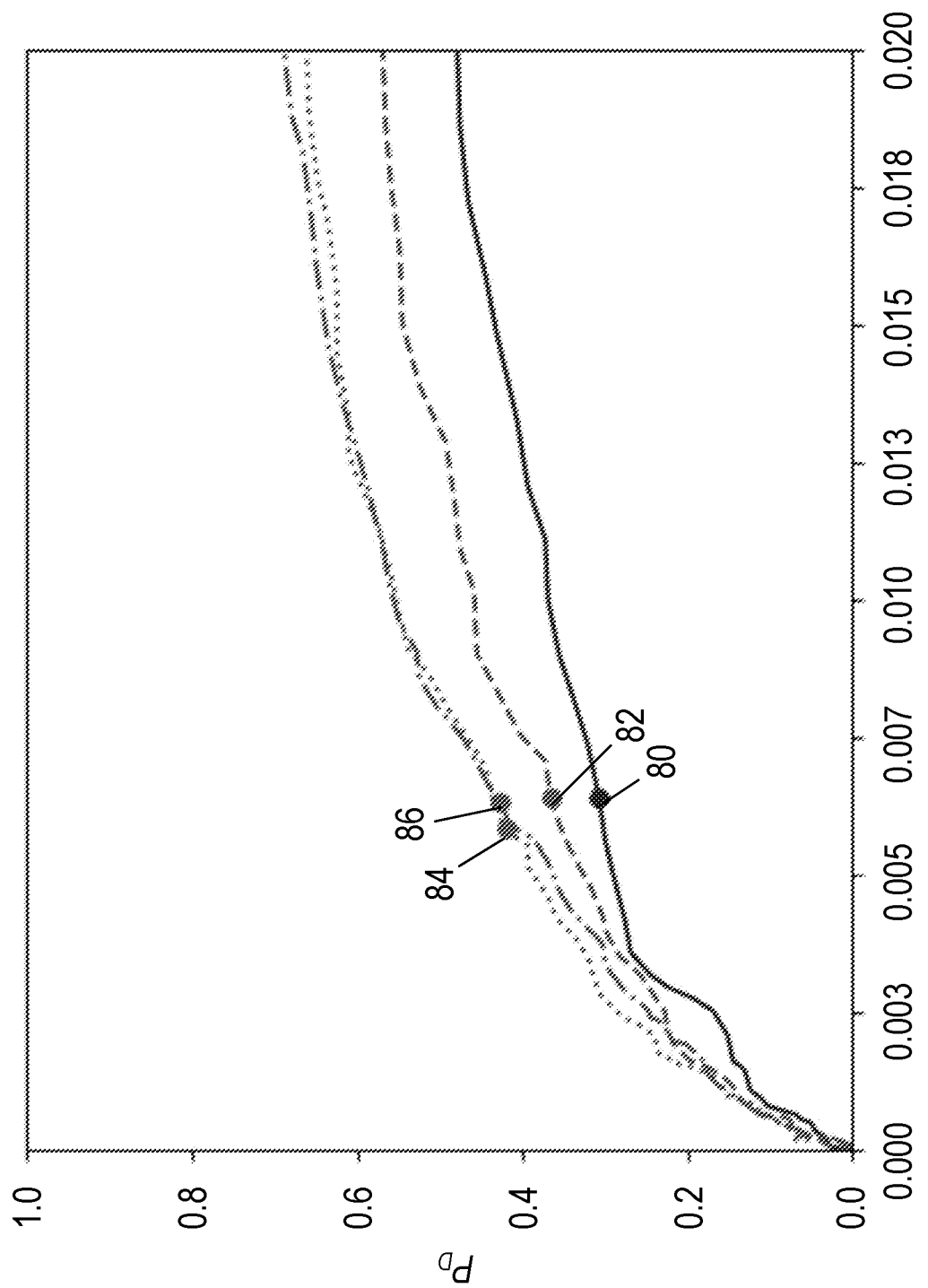

FIGS. 8-10 show respective plots of ROC curves for different configurations of a fall detection algorithm for respective different noise levels in the air pressure signal. For each of the ROC curves in each figure, a respective value for the decision threshold is indicated that provides a comparable false alarm rate. It should be noted that if the weighting of a feature is changed, or a feature included or excluded, the decision threshold will need to change since the range of the total sum of contributing features changes (even when the values of the features themselves are the same).

In FIG. 8, there is no noise in the air pressure signal, and FIG. 8 shows four ROC curves for respective configurations of the fall detection algorithm. The solid ROC curve is based on the air pressure-based features being included, and a decision threshold with a value of −0.07 is indicated by point 60. The dashed ROC curve is based on the air pressure-based features being weighted with a weighting of 0.5 (although it should be appreciated that this is an arbitrary value), and a decision threshold with a value of −0.01 is indicated by point 62. The dotted ROC curve is based on the air pressure-based features being weighted with a weighting of 0.2 (again it should be appreciated that this is an arbitrary value), and a decision threshold with a value of 1.42 is indicated by point 64. The dot-dashed ROC curve is based on the air pressure-based features being excluded, and a decision threshold with a value of 3.66 is indicated by point 66.

In FIG. 9, Gaussian noise with a standard deviation equivalent to 1.0 metres (m) is present in the air pressure signal, and FIG. 9 shows four ROC curves for respective configurations of the fall detection algorithm. Each ROC curve in FIG. 9 is shown with a respective value for the decision threshold. The solid ROC curve is based on the air pressure-based features being included, and a decision threshold with a value of 2.21 is indicated by point 70. The dashed ROC curve is based on the air pressure-based features being weighted with a weighting of 0.5, and a decision threshold with a value of 1.78 is indicated by point 72. The dotted ROC curve is based on the air pressure-based features being weighted with a weighting of 0.2, and a decision threshold with a value of 1.95 is indicated by point 74. The dot-dashed ROC curve is based on the air pressure-based features being excluded, and a decision threshold with a value of 3.40 is indicated by point 76.

In FIG. 10, Gaussian noise with a standard deviation equivalent to 2.0 m is present in the air pressure signal, and FIG. 10 shows four ROC curves for respective configurations of the fall detection algorithm. Each ROC curve in FIG. 10 is shown with a respective value for the decision threshold. The solid ROC curve is based on the air pressure-based features being included, and a decision threshold with a value of 2.87 is indicated by point 80. The dashed ROC curve is based on the air pressure-based features being weighted with a weighting of 0.5, and a decision threshold with a value of 2.40 is indicated by point 82. The dotted ROC curve is based on the air pressure-based features being weighted with a weighting of 0.2, and a decision threshold with a value of 2.58 is indicated by point 84. The dot-dashed ROC curve is based on the air pressure-based features being excluded, and a decision threshold with a value of 3.22 is indicated by point 86.

It can be seen from FIGS. 8-10 that when no noise is present, including the air pressure-based features is beneficial to the reliability of the fall detection algorithm. At the 1.0 m equivalent noise level the accuracy of the fall detection algorithm with and without the air pressure-based features is comparable. At the 2.0 m equivalent noise level the exclusion of the air pressure-related features from the fall detection algorithm is beneficial. Therefore, the threshold $\sigma_T^2$ at which the air pressure-based features should be included can be determined to be about 2.0 m. In a more pragmatic approach, the probability distributions 30, 32 can be measured, and a value of the threshold at which the false alarm rate reaches a certain value (e.g. 0.006) can be identified.

So, based on the above, to address issues with signal quality affecting the reliability of a movement evaluation algorithm, the techniques described herein provide an approach in which the configuration of the movement evaluation algorithm is adjusted or adapted in response to measurement signal quality issues. In some embodiments of the techniques, a decision threshold of the movement evaluation algorithm (for example a threshold beyond which a fall is detected or a threshold beyond which a particular physical activity is detected) may be determined based on the measurement signal quality. In other embodiments of the techniques, at least one weighting used in the movement evaluation algorithm for at least one feature derived from the measurement signal (i.e. where the weighting indicates or contributes an influence of the feature on the movement evaluation algorithm output) can be determined based on the measurement signal quality. In some embodiments, both a decision threshold for the movement evaluation algorithm and one or more weightings can be determined based on the measurement signal quality. In this way, the effect of signal quality issues on the reliability of the movement evaluation algorithm can be reduced.

In more detail, a signal representing measurements of the subject is obtained from a first sensor 6, with this signal being referred to herein as a "first signal", and the first signal is processed by the processing unit 12 to determine a quality measure for the first signal. The processing unit 12 then determines a configuration for a movement evaluation algorithm (e.g. that is to detect if a fall has occurred, to detect and/or evaluate a STS transfer, to detect a type of movement or activity the subject is performing/has performed, etc.). The configuration of the movement evaluation algorithm is dependent on the determined quality measure. In particular, in some embodiments a decision threshold of the movement evaluation algorithm is determined based on the determined quality measure. In further or alternative embodiments, one or more weightings used in the movement evaluation algorithm for one or more first features derived from the first signal are determined based on the determined quality measure.

General embodiments of the techniques presented herein for evaluating the movement of a subject are described below with reference to the flow chart in FIG. 11. As noted above, the evaluation of movement by the movement evaluation algorithm can include any of evaluating the walking ability of the subject, evaluating whether the subject has suffered a fall, detecting and/or evaluating a sit-to-stand movement, and determining the physical activity of the subject (i.e. determine what activity the subject is doing, such as sitting down, standing up, walking, running, ascending stairs, descending stairs, falling, lying down, exercising, etc.). The movement evaluation algorithm used in various embodiments may be a 'binary classifier', in which case the algorithm determines whether a particular type of movement/activity has occurred (e.g. detecting a fall, or no fall). The movement evaluation algorithm used in various other embodiments may be a 'multi-class classifier', in which case the algorithm determines which of several different types of movements/activities the subject is performing (e.g. fall, no fall, STS transfer, no STS transfer, walking, running, traversing stairs, etc.). Those skilled in the art will be aware of other types of evaluation of movement that the techniques described herein can be applied to.

Figure 11:
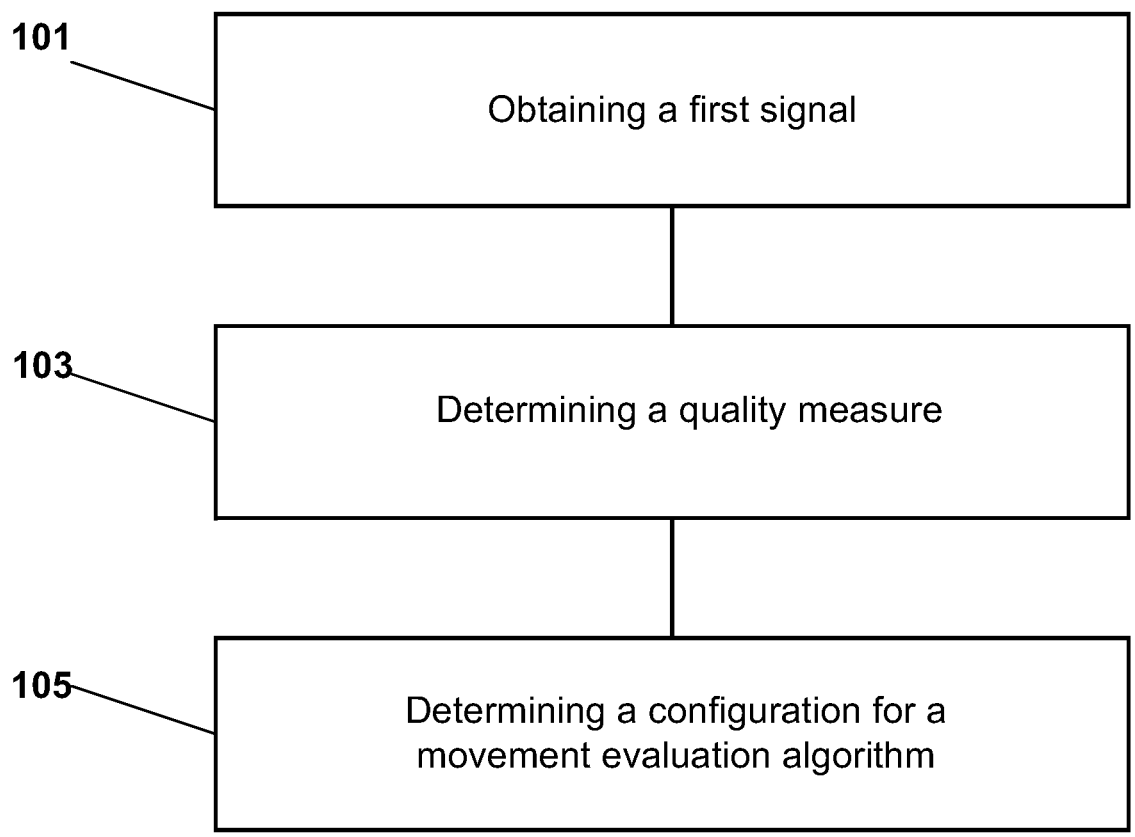
FIG. 11 is a flow chart illustrating a method according to an exemplary embodiment.

One or more of the steps of the method of FIG. 11 can be performed by the processing unit 12 in the apparatus 10, in conjunction with any of the first sensor 6, second sensor 8, memory unit 14, interface circuitry 16 and user interface 18 as appropriate. The processing unit 12 may perform the one or more steps in response to executing computer program code, that can be stored on a computer readable medium, such as, for example, the memory unit 14.

The first sensor 6 is in device 4, and steps 101-105 described below can be performed when the device 4 is being carried or worn by the subject. In that case, measurements by the first sensor 6 are measurements of the subject. Alternatively, steps 101-105 can be performed before the device 4 is being carried or worn by the subject, for example as part of a calibration procedure when the first sensor 6 is installed in device 4, when the device 4 is paired with the apparatus 10, or when the device 4 is activated (e.g. switched on). In that case, measurements by the first sensor 6 may be indicative of the environment, and/or noise and artefacts inherent in the first sensor 6.

In a first step, step 101, the processing unit 12 obtains a first signal from the first sensor 6. As noted, step 101 may be performed when the device 4 is being carried or worn by the subject, or before the device 4 is being carried or worn by the subject. The measurements in the first signal relate to at least a first time period. In this step, the processing unit 12 can obtain the first signal directly from the first sensor 6 or indirectly from the first sensor 6 (e.g. via interface circuitry 16 and interface circuitry 20). In these embodiments the processing unit 12 may be able to process the measurements as they are received (e.g. in real-time or near-real-time). Alternatively, the first signal may have been obtained previously and stored in the memory unit 14, in which case in step 101 the processing unit 12 can retrieve the first signal from the memory unit 14. In some embodiments the processing unit 12 can receive the first signal during the first time period or after the first time period has passed. Alternatively, the processing unit 12 can receive the first signal over the course of the first time period as the measurements are made. The first time period may have any suitable duration, for example the first time period can be at least 5 seconds (s), at least 10 s, at least 20 s, or at least 1 minute.

In some embodiments, the first sensor 6 can be a movement sensor, i.e. a sensor that measures movements of the subject over time, and the first signal obtained in step 101 is a "first movement signal". Thus, the first sensor 6 can be any of an accelerometer, an air pressure sensor, a magnetometer, a gyroscope, a satellite positioning system (SPS) receiver (e.g. a GPS receiver, a GLONASS receiver, a Galileo positioning system receiver, etc.), and a pressure sensor that can be positioned in the subject's shoe (or in each shoe) or other footwear to measure the pressure that the foot is applying to the ground (since sensors can provide measurements that are indicative of footsteps). In alternative embodiments, the first sensor 6 can be a skin conductivity sensor, a PPG sensor, or any other type of physiological characteristic sensor.

In step 103, the obtained first signal is processed to determine a quality measure for the first signal. The quality measure can be any type of measure of the quality of the first signal. For example the quality measure can be a measure of an offset in the measurements, a noise level in the measurements, a signal-to-noise ratio (SNR) for the first signal, signal variance, autocorrelation, median absolute deviation (MAD) or entropy.

In embodiments where the first sensor 6 is an accelerometer, the quality measure can be a measure of an offset in the acceleration signal. The offset can be determined as follows. In some embodiments, periods are identified from the acceleration signal where the variance of the three-dimensional (3D) signal is below a certain threshold (these are referred to as quiet or quasistatic periods). During these periods the norm is expected to be equal to the gravitational acceleration, approximately 9.81 ms$^{-2}$. The deviation of the norm of the signal in these periods from 9.81 ms$^{-2}$ is considered the offset. The offset would typically be available during multiple quasistatic periods, which may have different offsets due to changing orientations with respect to gravity. In that case the largest deviation may be used as the offset. Alternatively, it can be further estimated that the offset distributes over the three axes of the accelerometer according to the ratio at which gravity appears in them.

In embodiments where the first sensor 6 is an air pressure sensor, the quality measure can be a measure of the noise in the air pressure measurements. In some embodiments, the measure of the noise can be a measure of the variance in the air pressure measurements or the variance of changes of air pressure over time. The variance of the air pressure measurements can be determined using a time window (e.g. with a duration of a few seconds, 1 or 2 seconds, up to a couple of them, 5 to 10 seconds, or even a minute) is placed over the air pressure measurement signal and the variance in the air pressure measurements in the time window is computed. The time window might be a running window (i.e. it is moved over the air pressure signal), or it can be applied to the air pressure measurements at regular intervals. The variance of changes of air pressure over time can be determined by determining an air pressure difference signal as the difference between the measured air pressure at a current sample (time) and the measured air pressure at a sample (time) a few seconds ago (e.g. 2, 5 or 12 seconds), and determining the variance of the difference signal.

In step 105, the processing unit 12 determines a configuration for a movement evaluation algorithm that is to be used to evaluate the movement or some specific aspect of movement (e.g. a fall, STS transfer, etc.) of the subject. As part of the movement evaluation algorithm, values of one or more features are derived or determined from a signal from the first sensor 6, and those values are combined or analysed in order to provide the output of the movement evaluation algorithm.

The one or more features to be derived or determined from the measurements by the first sensor 6 are referred to as "first features". In various embodiments, a plurality of first features are evaluated as part of the movement evaluation algorithm, but in other embodiments a single first feature is evaluated as part of the movement evaluation algorithm. In embodiments that include a second sensor 8, measurements of the subject can be obtained by the second sensor 8, and one or more features can be derived or determined from these measurements. The one or more features derived or determined from the second signal are referred to as "second features". In various embodiments, a plurality of second features are evaluated as part of the movement evaluation algorithm, but in other embodiments a single second feature is evaluated as part of the movement evaluation algorithm.

The first feature(s) and second feature(s) (if used) are typically that or those features that are useful for evaluating the movement of the subject (e.g. features that are useful for detecting a fall, for evaluating the performance of a STS transfer, for determining the physical activity that the subject is performing, etc.).

As noted above, the movement evaluation algorithm uses the values of one or more features to take a decision on the movement of the subject. As used herein, the "feature" or "features" used by the movement evaluation algorithm includes at least one first feature, and, if measurements obtained from a second sensor 8, "features" also includes at least one second feature.

The decision or type of decision to be taken by the movement evaluation algorithm depends on the type of movement evaluation algorithm. For example the movement evaluation algorithm may be provided to detect a single type of movement. For example the movement evaluation algorithm can provide a binary decision (i.e. yes/no) on whether or not the subject is performing a particular type of movement or activity (e.g. walking, running, traversing stairs, lying down, sitting down, falling, etc.). Alternatively the movement evaluation algorithm may provide an output indicating which (if any) of multiple types of movement or activity the subject is performing.

In either case, in embodiments of the movement evaluation algorithm, the movement evaluation algorithm can have one or more decision thresholds that are used to evaluate the values of the one or more features and take the decision to determine the output of the movement evaluation algorithm. For example the movement evaluation algorithm may combine the values of the one or more features, and the combined value may be compared to a decision threshold to arrive at the output decision.

In other embodiments of the movement evaluation algorithm, particularly where values of a plurality of features are determined, the movement evaluation algorithm may combine the values to determine a combined value that is used to arrive at the output decision. The values may be combined in a way that enables the contribution of the different features to the combined value to be adjusted, for example based on the importance of the feature to the type of movement being detected. This contribution can be represented by a respective weighting (weighting value) for one or more of the features, or by a respective weighting for each of the features. In some embodiments, the combined value can be determined as a weighted sum of the values (e.g. where each value is a log likelihood for the relevant feature), a weighted average of the values or a weighted product of the values (e.g. where each value is a likelihood for the relevant feature). In the case of a weighted average, the average can be an arithmetic mean, a geometric mean or a harmonic mean. Those skilled in the art will be aware of various techniques for combining a number of different values for evaluation using weightings.

In some embodiments of the movement evaluation algorithm, the movement evaluation algorithm may both combine the values using a weighting for one or more of the features to determine a combined value, and compare the combined value to a decision threshold to determine the output of the movement evaluation algorithm.

As noted above, in step 105 the configuration of the movement evaluation algorithm, in terms of the decision threshold and/or the weighting(s) used for one or more features, is dependent on the quality measure determined in step 103 for the first signal. In particular, at a first value for the quality measure, the movement evaluation algorithm can have a first configuration, and at a second value for the quality measure, the movement evaluation algorithm can have a second configuration that is different to the first configuration. The adjustment in the configuration of the movement evaluation algorithm enables the performance of the movement evaluation algorithm to be maintained (as best as possible) even in the presence of quality issues with the first signal. The different configurations of the movement evaluation algorithm for different values of the quality measure can be predefined. In this case, the value for the quality measure is used to determine which of the predefined configurations to use to evaluate a signal from the first sensor 6.

In some embodiments, in the first configuration the decision threshold has a first value, and in the second configuration the decision threshold has a second value that is different to the first value. In some embodiments, the value of the decision threshold can be a function of the value of the quality measure.

In other embodiments, in the first configuration a respective weighting for one or more first features has a first (non-zero) value, and in the second configuration the respective weighting for the one or more first features has a second (non-zero) value different to the first value. For example, when the quality measure indicates that the first signal has a lower quality, the weighting for any first feature(s) that are affected by the lower quality can be lower (e.g. 0.5) compared to when the first signal has a better quality (e.g. the weighting can be 1). In embodiments where the weighting(s) are different depending on the quality measure, each weighting can have a value in the range (0, 1] (i.e. any value between 0 and 1, excluding 0). In some embodiments, the value of the weighting can be a function of the value of the quality measure. For example, the value of the weighting can be proportional to the quality measure, or inversely proportional to the quality measure (depending on whether high or low values of the quality measure represent better quality or worse quality).

In some embodiments, both the decision threshold and one or more weightings can be dependent on the quality measure of the first signal.

In some embodiments, determining the decision threshold based on the quality measure is achieved by changing the ROC curve of the movement evaluation algorithm. In some embodiments, if the quality of the first signal is (relatively) low, the decision threshold is an operating point on a different ROC for which the specificity of the movement evaluation algorithm is higher (so providing a reduced false alarm, P_FA, rate) at the cost of a reduced probability of the particular movement type or activity being detected (P_D). This example is based on the principle of maintaining or reducing the P_FA rate. Alternatively, the ROC curve to use may be determined such that the probability of the particular type of movement or activity being detected stays constant or relatively constant with changes in the quality of the first signal. Given the value of the quality measure for the first signal, it is possible to search for a weighting that maximises the ROC curve, i.e. that provides the largest area under the curve (AUC), and then determine the threshold by identifying an operating point on the ROC that has the selected false alarm rate.

In some embodiments, determining the weighting based on the quality measure is achieved by modifying the LLR tables for the first feature or the relevant first features. In particular, the movement evaluation algorithm may combine LLR values for each of the first features to determine an overall LLR value. One or more, or all, of the LLR tables can have a respective weighting, and the weighting can be adjusted. For example, the weighting for the LLR(s) for first features that are sensitive to the quality of the first signal can be reduced if the quality measure indicates that the quality of the first signal is (relatively) low. An LLR table is a form of implementing the computation in equation (1). In equation (1) the input is the feature vector $\bar{x}$. To simplify the computation, the so-called Naïve Bayesian Classifier (NBC) computes the LLR per first feature and sums those LLR values over all first features. The Naïve assumption is that features are independent—in that case the summing is strictly correct. In practice this works well. The sum is the overall LLR value. Alternatively another classifier principle may be used with the weightings and/or decision threshold being adapted. It should be noted that the LRT (as expressed in equation (2)) is known to be the most powerful detector [Neyman-Pearson theorem]. The NBC classifier is executing the LRT (aside from the Naïve assumption).

It will be appreciated by those skilled in the art that the modification of the weighting of a feature due to the quality measure is equivalent to multiplying all values of the first feature in the LLR table by the weighting. It will also be appreciated by those skilled in the art that a decision threshold can be changed by adding an offset to the LLR values in the LLR table.

In some embodiments, the movement evaluation algorithm may only have two different configurations, i.e. a first configuration for a first value for the quality measure (or a value below a quality measure threshold) and a second configuration for a second value for the quality measure (or a value above the quality measure threshold). In other embodiments, the movement evaluation algorithm may have more than two different configurations, i.e. different configurations for different values of the quality measure. In some embodiments, the configuration of the movement evaluation algorithm may be adjusted dynamically based on the value of the quality measure. For example the decision threshold for the movement evaluation algorithm can be a function of the value of the quality measure. In another example, the weighting of one or more of the first features can be a function of the value of the quality measure.

Once an appropriate configuration for the movement evaluation algorithm has been determined in step 105, the movement evaluation algorithm can be used to evaluate the movement of the subject. In embodiments where step 101 is performed when the device 4 is being carried or worn by the subject, the movement evaluation algorithm can process the first signal (which represents measurements of the subject) to evaluate the movement of the subject. Where step 101 is performed before the device 4 is being carried or worn by the subject, or more generally subsequently to determining the configuration of the movement evaluation algorithm, the processing unit 12 can obtain a further first signal from the first sensor 6, with the further first signal representing measurements of the subject in a time period after the first time period. The movement evaluation algorithm can process the further first signal to evaluate the movement of the subject during the second time period.

The processing unit 12 can then output an indication of the result of the algorithm. For example the movement evaluation algorithm can output an indication of whether the subject is performing (or has performed) a particular type of movement or activity. As another example, the movement evaluation algorithm can output an indication of which of a number of different types of movement or activity the subject is performing or has performed. The indication of the result can be output by the processing unit 12 via the user interface 18, for example to a user or the subject, and/or the indication of the result can be output by the processing unit 12 via the interface circuitry 16 to another electronic device or apparatus, such as a computer, laptop, computer, server, call centre (that respond when a fall is detected), etc. Such an output may indicate, for example, that the subject has fallen or not fallen (as appropriate), a measure of the performance of a STS transfer, or an indication of the movements or physical activity/ies that the subject has been doing.

In embodiments where the movement evaluation algorithm also uses measurements from the second sensor 8, when the movement of the subject is to be evaluated the processing unit 12 can also obtain a second signal representing measurements of the subject from the second sensor 8. The second signal is processed to determine values for one or more second features. The second sensor 8 may be a different type of sensor to the first sensor 6, or it can be same type of sensor, but located at a different position on the subject's body to provide measurements of a different part of the body of the subject. As with the first signal from the first sensor 6 (or the further first signal), the processing unit 12 can obtain the second signal directly from the second sensor 8 or indirectly from the second sensor 8, which includes retrieving the second signal from the memory unit 14. In some embodiments, the second sensor 8 is a movement sensor, i.e. a sensor that measures movements of the subject over time, and the second signal is a "second movement signal". Those skilled in the art will appreciate that more than two sensors can be used to obtain measurements of the subject.

As a first example of the above techniques, consider embodiments where the weighting of a first feature (or first features) is adapted based on the quality measure, the first sensor 6 is an accelerometer and the quality measure relates to offset in the acceleration measurements. In this example, the weighting of any one or more of the features: presence of an impact, change in altitude, velocity, vertical velocity, orientation of the subject and/or a part of the body of the subject, duration of the subject rising from a chair, peak acceleration of the subject rising from a chair, and peak power of the subject rising from a chair can be adjusted or adapted based on the quality measure. In particular, the weighting for any (or all) of these features can be lower when the offset in the acceleration measurements is high (with high offset corresponding to a lower quality), and vice versa. As a second example, consider embodiments where the first sensor 6 is an air pressure sensor, and the quality measure relates to variance (noise) in the air pressure measurements. In this example, the weighting of the altitude derived from the air pressure measurements can be adjusted or adapted based on the quality measure. In particular, the weighting for the altitude and related features, for example an altitude change observed over a time interval of a few seconds, can be lower when the noise in the air pressure measurements is high (with high noise corresponding to a lower quality), and vice versa.

In some embodiments, the method steps shown in FIG. 11 can be repeated over time for new measurements (i.e. a new instance of the first signal, or new measurement samples for the first signal) to determine if the configuration of the movement evaluation algorithm should be changed. It will be appreciated that the result of step 103 may vary over time (i.e. as the method in FIG. 11 is repeated for new measurements), for example if a source of noise in the measurements starts or stops. For example in the case of the first sensor 6 being an air pressure sensor, there may be a period of time where a window is opened, leading to the quality of the air pressure measurements being low thereby affecting the reliability of an altitude measurement derived from the air pressure measurements. In this case a fall may be (incorrectly) detected according to a 'standard' fall detection algorithm, but the techniques provided herein modify a weighting associated with an air pressure-derived altitude measurement or a decision threshold so that the lower quality air pressure signal is still used in the algorithm but does not adversely affect the reliability of the fall detection algorithm. However, once the window is closed (or before the window was opened), the quality of the air pressure measurements may be better and provide a more reliable measure of altitude. In that case, the weighting associated with the air pressure-derived altitude measurement is higher or the decision threshold associated with the fall detection algorithm is adjusted so that the fall detection algorithm makes use of the altitude feature.

In some embodiments, it is possible to determine multiple different quality measures for the first signal in step 103, and the values of each of the quality measures can be used to determine the configuration of the movement evaluation algorithm. The configuration of the movement evaluation algorithm can be adjusted in different ways depending on the particular values of the quality measures. For example, if a first quality measure is low (indicating low quality), the weighting for a first 'first feature' can be reduced compared to when the first quality measure is high or 'normal', whereas if a second quality measure is low (indicating low quality), the weighting for a second 'first feature' can be reduced compared to when the second quality measure is high or 'normal'. Likewise, the decision threshold can be adjusted by different amounts depending on which of the first quality measure and the second quality measure indicate high/low quality. A first quality measure for an acceleration signal can be an amount of offset in the acceleration signal, with the weighting of the first features peak acceleration and peak power being reduced if the offset is high (quality is low). A second quality measure can be a measure of white noise in the acceleration signal, with the weighting of the jerk being reduced if the white noise level is above a noise threshold (the quality is low), as jerk is sensitive to white noise.

In embodiments where the movement evaluation algorithm also uses a second signal from a second sensor 8, the processing unit 12 can also determine a quality measure from the second signal, and the value of this quality measure can also be used to adjust the configuration of the movement evaluation algorithm.

In a first specific example of the above techniques, in which the performance of a sit-to-stand (STS) transfer by the subject is evaluated by the movement evaluation algorithm, the first sensor 6 can be an accelerometer, and the quality measure can be an amount (magnitude) of offset present in the acceleration measurements. If the magnitude of the offset is below a threshold value (indicating high(er) quality), then the performance of the STS transfer can be evaluated based on the first features: duration of the subject rising from a chair, peak acceleration of the subject rising from a chair, peak power of the subject rising from a chair, and maximum jerk of the subject rising from a chair, with the respective weightings of these features having respective values. However, if the magnitude of the offset is above the threshold value (indicating low quality), then the values of the first features duration, peak acceleration and peak power will be less accurate or less unreliable as a result of the offset. In that case the weightings of the first features duration, peak acceleration and peak power are set lower than when the offset was below the threshold value to reduce the influence of these features on the output of the STS transfer evaluation.

In a second specific example, in which the movement evaluation algorithm determines if the subject has suffered a fall, the first sensor 6 can be an air pressure sensor, and the quality measure can be an amount of noise present in the air pressure measurements. The noise can be intrinsic to the used sensor, i.e. as present in the device as chosen by the subject to be worn. The noise level can also vary dynamically, for example during stormy weather conditions more fluctuations will appear in the air pressure measurements. A second sensor 8 in the form of an accelerometer is also used to obtain acceleration measurements. If the amount of noise in the air pressure measurements is below a threshold value (indicating good quality), then the fall detection can be performed based on the first feature change in altitude with a respective weighting value, and the values of second features that are determined from the second signal (the acceleration signal): occurrence of an impact, change in orientation, and a period in which the subject is motionless. Each of the second features may also have a respective weighting. However, if the amount of noise in the air pressure signal is above the threshold value (indicating low quality), then the value of the change in altitude determined from the air pressure signal will be less accurate or less reliable as a result of the noise. In that case fall detection is performed with a lower weighting for the change in altitude derived from the air pressure measurements to reduce the influence of this feature on the fall detection.

In a third specific example, which is an extension of the second specific example above, as it is noted that a change in altitude is a useful indicator of whether a subject has fallen, and that it is also possible to determine a change in altitude from acceleration measurements. Thus, when there is too much noise in the air pressure signal (i.e. the noise is above the threshold value and the weighting applied to the change in altitude determined from the air pressure signal is reduced), the processing unit 12 can additionally process the acceleration signal to determine a change in altitude of the subject, and use this change in altitude in determining if the subject has fallen. As an alternative, the fall detection algorithm may already process the acceleration signal to determine a change in altitude of the subject (i.e. even when the quality of the air pressure signal is high), in which case the weighting for the acceleration-derived change in altitude can be low when the air pressure signal quality is high, and the weighting for the acceleration-derived change in altitude can be increased when the air pressure signal quality is low so it acts as a replacement for the air pressure-derived change in altitude in the fall detection algorithm.

In some embodiments, steps 101 and 103 can be performed periodically, for example every second or every few seconds (e.g. in order to detect short-term changes in the quality of the measurement signal), every minute or every few minutes (likewise), every hour or every few hours (e.g. to detect medium-term changes in the quality of the measurement signal, such as due to the weather or other environmental changes), or every day or every few days (likewise).

Therefore there is provided techniques that enable reliable evaluation of the movement of a subject irrespective of artefacts or quality issues present in a measurement signal from a sensor that measures the subject.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for evaluating movement of a subject, the method comprising:
   obtaining a first signal from a first sensor, the first signal including a plurality of first measurements generated by the first sensor;
   processing the plurality of first measurements of the first signal to determine a measurement quality in the plurality of first measurements, the measurement quality based on:
      a comparison between acceleration measurements and gravitational acceleration; or
      variance of air pressure measurements; and
   determining a configuration for a movement evaluation algorithm,
   wherein the configuration of the movement evaluation algorithm is determined based on the determined measurement quality in the plurality of first measurements, and
   wherein the determining the configuration of the movement evaluation algorithm includes at least one of:

determining a decision threshold of the movement evaluation algorithm based on the determined measurement quality in the plurality of first measurements; or determining one or more weightings used in the movement evaluation algorithm based on the determined measurement quality in the plurality of first measurements.

2. The method as claimed in claim 1, further comprising:
obtaining a further first signal from the first sensor, the further first signal including a plurality of second measurements; and
processing the plurality of second measurements of the further first signal using the movement evaluation algorithm with the determined configuration.

3. The method as claimed in claim 1, further comprising processing the plurality of first measurements of the first signal using the movement evaluation algorithm with the determined configuration.

4. The method as claimed in claim 1, wherein the decision threshold of the movement evaluation algorithm is adjusted based on the determined measurement quality in the plurality of first measurements.

5. The method as claimed in claim 4, wherein the movement evaluation algorithm is configured based on the determined measurement quality in the plurality of first measurements such that, at a first measurement quality of the determined measurement quality, the decision threshold has a first value, and at a second measurement quality of the determined measurement quality that is lower than the first measurement quality, the decision threshold has a second value that is higher than the first value of the decision threshold.

6. The method as claimed in claim 1, wherein the movement evaluation algorithm is configured based on the determined measurement quality in the plurality of first measurements such that, at a first measurement quality of the determined measurement quality, the decision threshold is an operating point on a first receiver operating characteristics, ROC, curve that provides a first specificity and first detection probability, and at a second measurement quality of the determined measurement quality that is lower than the first measurement quality, the decision threshold is an operating point on a second ROC curve that provides a second specificity that is higher than the first specificity and a second detection probability that is lower than the first detection probability.

7. The method as claimed in claim 1, wherein, when the determining the configuration of the movement evaluation algorithm includes the determining the one or more weightings, the one or more weightings are adjusted based on the determined measurement quality.

8. The method as claimed in claim 7, wherein the movement evaluation algorithm is configured based on the determined measurement quality in the plurality of first measurements such that, at a first measurement quality of the determined measurement quality, a first weighting for a first specific first feature has a first value, and at a second measurement quality of the determined measurement quality that is lower than the first measurement quality, the first weighting has a second value that is lower than the first value of the first weighting.

9. The method as claimed in claim 7, wherein each weighting has a non-zero value between 0 and 1.

10. A computer program product embodied on a computer readable medium for evaluating movement of a subject, the computer program product comprising:

computer code for obtaining a first signal from a first sensor, the first signal including a plurality of first measurements generated by the first sensor;
computer code for processing the plurality of first measurements of the first signal to determine a measurement quality in the plurality of first measurements, the measurement quality based on:
a comparison between acceleration measurements and gravitational acceleration; or
variance of air pressure measurements; and
computer code for determining a configuration for a movement evaluation algorithm,
wherein the configuration of the movement evaluation algorithm is determined based on the determined measurement quality in the plurality of first measurements, and
wherein the computer code for the determining the configuration of the movement evaluation algorithm includes at least one of:
computer code for determining a decision threshold of the movement evaluation algorithm based on the determined measurement quality in the plurality of first measurements; or
computer code for determining one or more weightings used in the movement evaluation algorithm based on the determined measurement quality in the plurality of first measurements.

11. The computer program product as claimed in claim 10, wherein the computer code for processing the plurality of first measurements of the first signal to determine a measurement quality in the plurality of first measurements includes computer code for determining an offset based on the comparison between the acceleration measurements and the gravitational acceleration.

12. The computer program product as claimed in claim 10, wherein the computer code for processing the plurality of first measurements of the first signal to determine a measurement quality in the plurality of first measurements includes computer code for determining a noise level based on the variance of the air pressure measurements.

13. An apparatus for evaluating movement of a subject, the apparatus comprising a processing unit that is configured to:
obtain a first signal from a first sensor, the first signal including a plurality of first measurements generated by the first sensor;
process the plurality of first measurements of the first signal to determine a measurement quality in the plurality of first measurements, the measurement quality based on:
a comparison between acceleration measurements and gravitational acceleration; or
variance of air pressure measurements; and
determine a configuration for a movement evaluation algorithm that is for evaluating movement of the subject,
wherein the configuration of the movement evaluation algorithm is determined based on the determined measurement quality in the plurality of first measurements, and
wherein the configuration of the movement evaluation algorithm includes at least one of:
a decision threshold of the movement evaluation algorithm based on the determined measurement quality in the plurality of first measurements; or one or more weightings used in the movement evaluation algorithm based on the determined measurement quality in the plurality of first measurements.

14. The apparatus as claimed in claim 13, wherein the processing unit is further configured to:
    obtain a further first signal from the first sensor, the further first signal including a plurality of second measurements; and
    process the plurality of second measurements of the further first signal using the movement evaluation algorithm with the determined configuration.

15. The apparatus as claimed in claim 13, wherein the processing unit is further configured to process the plurality of first measurements of the first signal using the movement evaluation algorithm with the determined configuration.

16. The apparatus as claimed in claim 13, wherein the decision threshold of the movement evaluation algorithm is adjusted based on the determined measurement quality in the plurality of first measurements.

17. A system for evaluating movement of a subject, the system comprising:
    a device that is to be worn or carried by a subject and that comprises a first sensor for measuring the subject to generate the first signal; and an apparatus as claimed in claim 13.

18. The apparatus as claimed in claim 13, wherein, when the determining the configuration of the movement evaluation algorithm includes the determining the one or more weightings, the one or more weightings are adjusted based on the determined measurement quality in the plurality of first measurements.

19. The apparatus as claimed in claim 13, wherein the processing the plurality of first measurements of the first signal to determine the measurement quality in the plurality of first measurements includes at least one of:
    determining an offset based on the comparison between the acceleration measurements and the gravitational acceleration; or
    determining a noise level based on the variance of the air pressure measurements.

20. The apparatus as claimed in claim 13, wherein:
    when the first sensor comprises an accelerometer, the processing the plurality of first measurements of the first signal to determine the measurement quality in the plurality of first measurements includes determining an offset based on the comparison between the acceleration measurements and the gravitational acceleration; and
    when the first sensor comprises an air pressure sensor, the processing the plurality of first measurements of the first signal to determine the measurement quality in the plurality of first measurements includes determining a noise level based on the variance of the air pressure measurements.

* * * * *